(12) United States Patent
Alhumaidan et al.

(10) Patent No.: US 11,505,466 B1
(45) Date of Patent: Nov. 22, 2022

(54) SYNTHESIZING GRAPHENE DERIVATIVES FROM ASPHALTENE

(71) Applicant: KUWAIT INSTITUTE FOR SCIENTIFIC RESEARCH, Safat (KW)

(72) Inventors: Faisal S. Alhumaidan, Al-Shamiyah (KW); Mohan S. Rana, Mahboulla (KW); Vinoba Mari, Safat (KW)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 0 days.

(21) Appl. No.: 17/869,422

(22) Filed: Jul. 20, 2022

(51) Int. Cl.
*C01B 32/19* (2017.01)
*C01B 32/196* (2017.01)

(52) U.S. Cl.
CPC ............ *C01B 32/19* (2017.08); *C01B 32/196* (2017.08)

(58) Field of Classification Search
CPC ..... C01B 32/19; C01B 32/196; C01B 32/182; C01B 32/184; C01B 32/186; C01B 32/188; C01B 32/192; C01B 32/194; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23
See application file for complete search history.

(56) References Cited

U.S. PATENT DOCUMENTS

| | | | |
|---|---|---|---|
| 9,862,609 B2 | 1/2018 | Deemer et al. | |
| 2012/0228555 A1 | 9/2012 | Cheng et al. | |
| 2016/0039678 A1* | 2/2016 | Tanimola | C01B 32/156 |
| | | | 423/445 B |
| 2016/0060122 A1* | 3/2016 | Tour | C01B 32/182 |
| | | | 564/123 |
| 2016/0304350 A1* | 10/2016 | Deemer | C01B 32/184 |
| 2017/0128929 A1* | 5/2017 | Kumar | C10G 47/26 |
| 2020/0091082 A1* | 3/2020 | Deemer | H01L 21/288 |

FOREIGN PATENT DOCUMENTS

WO 2020186011 A1 9/2020

OTHER PUBLICATIONS

Liu, et al., Synthesis of three-dimensional graphene from petroleum asphalt by chemical vapor deposition, Materials Letters 2014; 122: 285-288 (Year: 2014).*
Shamaila, et al., Modifications in development of graphene oxide synthetic routes, Chemical Engineering Journal 2016; 294: 458-477 (Year: 2016).*
Liu et al., "Synthesis of three-dimensional graphene from petroleum asphalt by chemical vapor deposition", Materials Letters (2014) vol. 122, pp. 285-288.
Wu et al., "Preparation of Three-Layer Graphene Sheets from Asphaltenes Using a Montmorillonite Template", Journal of Nanomaterials (2019), Article ID 2094723, 6 pp.

* cited by examiner

*Primary Examiner* — Daniel C. McCracken
(74) *Attorney, Agent, or Firm* — Nath, Goldberg & Meyer; Richard C. Litman

(57) ABSTRACT

The method for synthesizing graphene derivatives from asphaltene includes one or more steps that are based on thermal and/or chemical treatments. In the thermal treatment, asphaltene was carbonized in a rotating quartz-tube furnace under an inert atmosphere ($N_2$). This carbonization process was performed at a temperature range of 400-950° C. The carbonization process converted asphaltene molecules into graphene derivatives by eliminating the alkyl side chains, exfoliating the aromatic layers (n), and expanding the aromatic sheet diameter ($L_a$). The chemical treatment, on the other hand, was performed on the asphaltene (i.e., graphene precursor) by dispersing the asphaltene molecules in a liquid intercalating agent to functionalize the asphaltene and expand the inter-layer distance between the aromatic sheets (intercalation). In this intercalation process, the graphitic surface of asphaltene is oxidized to form asphaltene oxide, and then graphene oxide (GO), which is a nonconductive hydrophilic carbon material.

18 Claims, 18 Drawing Sheets

SYNTHESIZING GRAPHENE DERIVATIVES FROM ASPHALTENE

BACKGROUND

1. Field

The disclosure of the present patent application relates to new uses for byproducts of petroleum refining, and particularly to synthesizing graphene derivatives from asphaltene.

2. Description of the Related Art

Crude oil mainly constitutes four hydrocarbon fractions: saturates, aromatics, resins, and asphaltenes (SARA fractions). These fractions are normally classified based on the solubility and the polarity of their components. Asphaltene is habitually regarded as the fraction of crude that is soluble in aromatic solvent, but insoluble in light paraffins, such as hexane and heptane. It is also often viewed as the dispersed colloid in crude oil that is stabilized by the polyaromatic molecules of the resins fraction, which act as protective bodies for asphaltene. If the protective shields provided by the resins are removed or disturbed, asphaltenes normally precipitate. Asphaltene is commonly considered the most refractory fraction in crude oil and is frequently associated with major operational problems in petroleum industries. For example, the tendency of asphaltene to precipitate in pipelines and processing equipment commonly results in severe blockage and sharp declines in oil flow in the upstream industry. Similarly, asphaltene poses a serious problem in the downstream industry, since it is primarily considered a major coke precursor and is often related to catalyst deactivation.

The hypothetical molecular structure of asphaltene is composed of highly condensed polycyclic aromatic core substituted with varying alkyl side chains, along with traces of heteroatoms (e.g., S, N, and O) and traces of metals (e.g., Ni and V) as part of the ring system. The aromatic core of asphaltene is mainly composed of stacked aromatic sheets, where the number of aromatic sheets per stack can significantly vary between the different asphaltene molecules (i.e., 3-8 sheets per stack). Each sheet has 3-10 rings, mostly aromatic, but not excluding naphthenic and non-aromatic cyclic rings. The interlayer distance between the sheets normally remains in the range of 0.35-0.36 nm. Thus, asphaltene can be viewed as a layered material that has similar structure to graphene hydrocarbon material.

Asphaltene is considered a low-value byproduct in the petroleum industry, or sometimes a waste, due to its economic burdens.

On the other hand, graphene is an allotrope of carbon, consisting of a single layer of atoms arranged in a two-dimensional honeycomb lattice nanostructure. Graphene is regarded as a valuable and useful nanomaterial due to its exceptionally high tensile strength, electrical conductivity, transparency, and for being the thinnest two-dimensional material in the world. Graphene derivatives, i.e., graphene incorporating heteroatoms, such as nitrogen and sulfur, and which may contain trace metals, are also regarded as being valuable, as they have slightly different electrical properties, useful in the production of semiconductors, for example.

Thus, a method for synthesizing graphene derivatives from asphaltene solving the aforementioned problems is desired.

SUMMARY

The method for synthesizing graphene derivatives from asphaltene includes one or more steps that are based on thermal and/or chemical treatments. In the thermal treatment, asphaltene is carbonized in a rotating quartz-tube furnace under an inert atmosphere ($N_2$). This carbonization process is performed at a temperature range of 400-950° C. The losses due to the thermal treatment varied between 45 and 55 wt %, depending on temperature. The carbonization process converted asphaltene molecules into graphene derivatives by eliminating the alkyl side chains, exfoliating the aromatic layers (n), and expanding the aromatic sheet diameter ($L_a$). The chemical treatment, on the other hand, was performed on the asphaltene (i.e., graphene precursor) by dispersing the asphaltene molecules in a liquid intercalating agent to functionalize the asphaltene and expand the inter-layer distance between the aromatic sheets (intercalation). In this intercalation process, the graphitic surface of asphaltene is oxidized to form asphaltene oxide, and then graphene oxide (GO), which is a nonconductive hydrophilic carbon material. The functionalized asphaltene carried the hydroxyl and epoxide functional groups on their basal planes, and the carbonyl and carboxyl groups at the sheet edges. The chemical exfoliation was followed by a mechanical exfoliation as the suspension was subjected to an ultrasonic agitation to separate the aromatic-sheets (or layers) from one another. The separation of graphene oxide from the aqueous solution was accomplished using gradient differential centrifugation. The separation process was performed under the swing condition, where the temperature and the speed of rotation varied. The effect of heteroatoms (i.e., sulfur and nitrogen) on graphene derivatives is assessed by studying asphaltenes from different origins with different levels of impurities.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
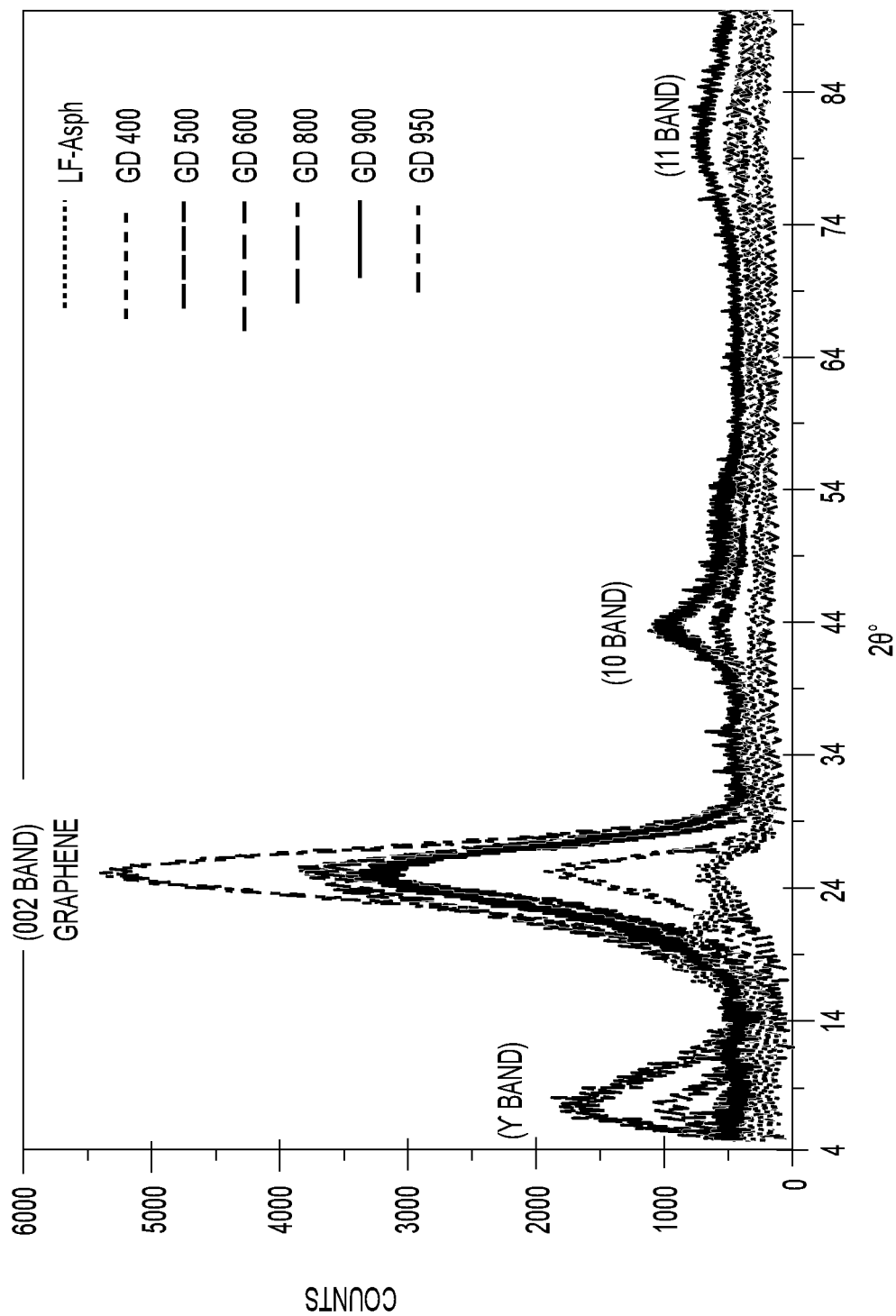
FIG. 1 is a composite diffractogram showing X-ray diffraction (XRD) patterns for LF asphaltene at different temperatures.

The method for synthesizing graphene derivatives from asphaltene includes one or more steps that are based on thermal and/or chemical treatments. In the thermal treatment, asphaltene was carbonized in a rotating quartz-tube furnace under an inert atmosphere ($N_2$). This carbonization process was performed at a temperature range of 400-950° C. The losses due to the thermal treatment varied between 45 and 55 wt %, depending on temperature. The carbonization process converted asphaltene molecules into graphene derivatives by eliminating the alkyl side chains, exfoliating the aromatic layers (n), and expanding the aromatic sheet diameter ($L_a$). The chemical treatment, on the other hand, was performed on the asphaltene (i.e., graphene precursor) by dispersing the asphaltene molecules in a liquid intercalating agent to functionalize the asphaltene and expand the inter-layer distance between the aromatic sheets (intercalation). In this intercalation process, the graphitic surface of asphaltene is oxidized to form asphaltene oxide, and then graphene oxide (GO), which is a nonconductive hydrophilic carbon material. The functionalized asphaltene carried the hydroxyl and epoxide functional groups on their basal planes, and the carbonyl and carboxyl groups at the sheet edges. The chemical exfoliation was followed by a mechanical exfoliation as the suspension was subjected to an ultrasonic agitation to separate the aromatic-sheets (or layers) from one another. The separation of graphene oxide from the aqueous solution was accomplished using gradient differential centrifugation. The separation process was performed under the swing condition, where the temperature and the speed of rotation varied. The effect of heteroatoms (i.e., sulfur and nitrogen) on graphene derivatives is assessed by studying asphaltenes from different origins with different levels of impurities.

Asphaltene is characteristically considered as a macromolecule that has a rigid aromatic core with flexible alkyl side chains and a relatively high amount of heteroatoms and metals. Asphaltene can be regarded as an ideal template to form graphene, where the aromatic moieties of asphaltene can recombine to form graphene. Graphene, on the other hand, is a monolayer of carbon atoms that are arranged in a two-dimensional honeycomb lattice. This single layer nanomaterial of $sp^2$ network of carbon atoms has attracted wide attention from the scientific community and the industrial sector because of its extraordinary properties. In addition to the single-layer sheet, graphene may also be composed of multi-layers, together known as nano-graphene platelets (NGPs).

The present disclosure provides different methods through which graphene derivatives can be produced from asphaltene. These different approaches have been attempted to come up with potentially feasible and scalable means for producing a broad variety of graphene derivatives for industrial and commercial applications.

The methods of the present disclosure mainly rely on thermal and/or chemical treatments. The treatments were optimized to produce high quality graphene derivatives from asphaltene. The quality of the graphene derivatives was verified by different characterization techniques, including Raman Spectroscopy, X-Ray Diffraction (XRD), X-ray fluorescence (XRF), Fourier-Transform Infrared (FTIR), Scanning Electron Microscopy (SEM), Energy Dispersive Spectroscopy (EDS), and CHNS (carbon, hydrogen, nitrogen, sulfur) elemental analysis. The XRD analysis was conducted on the parent asphaltene and its corresponding carbonized products to determine their crystallinity levels and to monitor the changes in their structural parameters. The level of crystallinity is normally reflected by the strong peak observed at 20-26°, known as the graphene band; while the impact of carbonization on asphaltene macro-structure is usually revealed by measuring different structural parameters, such as the layer distance between the aromatic sheets ($d_m$), distance between aliphatic chains and naphthenic sheets (dγ), average diameter of the aromatic sheet ($L_a$), number of aromatic sheet per stack (n), cluster diameter ($L_c$), and aromaticity ($f_a$). Raman Spectroscopy was also utilized to characterize the parent asphaltene and its graphene derivatives. The Raman spectra for crystalline carbon materials, such as graphene and graphite, normally exhibit three prominent peaks at ~1350, ~1580, and ~2700 $cm^{-1}$, which are respectively known as the D-, G-, and 2D-bands. The D-band is related to the defects and disorder in the graphitic structure, including the grain boundaries and heteroatoms; whereas the G-band corresponds to the in-plane vibration of the $sp^2$ carbon. The 2D-band, in contrast, arises due to a second-order two-phonon process and exists in all $sp^2$ carbon materials. Irrespective of the discrepancy in literature on the calculation of structural parameters of carbon-based material from Raman spectra, there is an agreement among researchers that there are basically two graphitization indicators in the Raman analysis, which are the intensity ratio between the D- and G-bands ($I_D/I_G$) and the full width at half-maximum of the G-band ($FWHM_G$). The FTIR characterization was also utilized to elucidate the changes in the functional groups of asphaltene molecule and its corresponding graphene derivatives. The IR spectrum clearly illustrated the structural diversity of the asphaltene molecule and showed that the peaks mainly fell into three wavenumber regions; namely: (1) aromatic and aliphatic C—H stretching modes from 3150 to 2750 $cm^{-1}$; (2) CC, CO, and CN stretching, as well as CH, NH, and SH deformation modes from 1800 to 1000 $cm^{-1}$; and (3) aromatic CH out-of-plane deformation, as well as skeletal modes below 1000 $cm^{-1}$.

The asphaltene subjected to the thermal and/or chemical treatments in the present disclosure are mainly derived from Kuwaiti conventional crude (i.e., Kuwait Export crude, KEC), Kuwaiti heavy crude (Lower-Fars crude), and Mexican crude oil (Ku crude oil). The asphaltenes from these crude oils have been carefully selected because of the differences in their structures and compositions. For example, our previous studies on Kuwaiti asphaltenes clearly indicated that LF-asphaltene is relatively larger than other Kuwaiti asphaltenes with higher heteroatom content. However, it is more prone and susceptible to structural changes when exposed to thermal treatment than the other asphaltenes. The vulnerability of LF-asphaltene toward thermal cracking resulted in a substantial decrease in the cluster diameter due to the loss of aliphatic carbon in the side chains and the decrease in the aromatic sheet per stack. Ku-asphaltene, on the other hand, has been selected due to high impurity levels (i.e., heteroatom and metal contents), which can provide good information about the impact of a precursor's impurities on graphene properties.

One embodiment of the present disclosure is a method of producing graphene derivatives from asphaltene by thermal treatment. In this treatment, graphene derivatives were synthesized from asphaltene by a top-down approach. Asphaltene was carbonized in a rotating quartz-tube furnace under inert atmosphere at a temperature range of 400-950° C. The carbonization process converted asphaltene molecules into graphene derivatives by eliminating the alkyl side chains, exfoliating the aromatic layers (n), and expanding the aromatic sheet diameter ($L_a$). The elimination of the alkyl side chains was confirmed by Fourier transform infrared (FTIR) analysis, while the exfoliation of aromatic layers was verified by X-ray diffraction (XRD) and Raman analyses. The XRD and Raman results also revealed an increase in the aromatic sheet diameter as the carbonization temperature increased, which would suggest secondary reactions in the aromatic core of asphaltene.

In another embodiment, the previously indicated thermal treatments have been imposed on asphaltenes from different origins with different structures and compositions. The utilization of different asphaltenes provides valuable information about the impact of precursors' impurities (i.e., heteroatoms and metals) on the properties of the synthesized graphene derivatives.

In certain embodiments, the density of defects in graphene derivatives was quantified by measuring the average distance between defects ($L_D$). The result showed an almost consistent trend between the $L_D$ measurements and heteroatom content (i.e., S & N), which would infer that the observed defects are mainly associated with the presence of heteroatoms in the aromatic layers. The elemental analysis also indicated insignificant changes in sulfur and nitrogen contents for all samples, indicative of the existence of these heteroatoms within the intact aromatic sheets.

In other embodiments, the graphene derivatives were synthesized from asphaltene by a number of chemical treatments. In these chemical treatments, the asphaltene was initially ground and then treated with different intercalants and/or oxidants, at different concentrations, to functionalize the asphaltene molecule and form asphaltene oxide and then GO. The term "asphaltene functionalization" refers to chemical processes that introduce chemical functional groups to the aromatic layers in the asphaltene structure. In these embodiments, the functionalization of asphaltene introduced different oxygen groups, such as hydroxyl, carbonyl, carboxyl, epoxy, peroxy, and ether. The mechanism of GO formation from asphaltene started with the peroxidation step in which asphaltene was converted to acid-asphaltene intercalation compounds (i.e., $H_2SO_4$-AIC) or asphaltene oxide, which is considered the first reaction intermediate. The second step was the deep oxidation, where a strong oxidant, such as $KMnO_4$, is added to the reaction mixture. In this step, the asphaltene oxide is transformed to GO, which is considered the second reaction intermediate. The formation of GO is a diffusion-controlled oxidation in which the oxidizing agents replaced the acid intercalant, and it is considered the rate determining step for GO formation reaction. The next step was the hydrolysis and exfoliation of GO after the addition of water (i.e., quenching and washing step). The previously stated intercalation and oxidation treatments significantly increased the inter-layer distance between the aromatic sheets. Once this chemical exfoliation (i.e., oxidation and intercalation) was completed, GO was subjected to further expansion through mechanical exfoliation of ultrasonication. The applied sonic frequency, which was 44 kHz±6%, may also induce chemical reactions of the intercalating agents and disrupt the bonding in the asphaltene structure, leading to the detachment of the neighboring aromatic sheets.

In a further embodiment, the asphaltene particles were initially dissolved in organic and/or inorganic solvents. The solvents were utilized to fully disperse the asphaltene particles and to provide a media for assisting the hydrolysis of functionalizing compounds. In this embodiment, the solvents may be toluene, benzene, carbon disulfide, or any combination thereof. The solution was ultrasonicated and then exposed to intercalating and oxidizing agents to form functionalized asphaltene molecules, and subsequently GO.

In some embodiments, the chemical treatments were validated by using commercial graphite as a reference material. Graphite crystallite is typically composed of a high number of graphene sheets that are stacked and bonded through van der Waals forces in the direction perpendicular to the basal plane. Asphaltene is very susceptible to oxidation treatment, and much more vulnerable than graphite. Therefore, the conventional oxidation treatments proposed for graphite should be carefully reviewed and adjusted to suit asphaltene and to maintain its aromatic structure.

In some embodiments, both the thermal and the chemical treatments were combined. The process starts by thermally treating asphaltene in a rotating quartz-tube furnace under inert atmosphere at high temperature (i.e., 950° C.). Then, the thermally treated products were subjected to certain chemical treatments to enhance the properties of the graphene derivatives.

The above principles will be better understood by reference to the following examples.

Example 1

Asphaltene Extraction

The asphaltene samples were extracted from three crude oils, namely, Kuwait export crude (KEC), Lower-Fars heavy crude (LF), and Mexican Ku-crude oil (Ku). KEC is a conventional crude oil, while LF and Ku are heavy crude oils. The Mexican Ku-crude oil was selected because it is known for its high heteroatom and metal content, which can provide good information about the impact of a precursor's impurities (e.g., Ni, V, S, and N) on the properties of graphene. The asphaltenes were extracted in accordance with the method described in IP 143/90 standard (ASTM 6560), using n-heptane solvent extraction in a ratio of 30 ml to each 1 gm of sample. The percentage of asphaltenes collected from each sample to the total feedstock were noted, and the properties of the extracted asphaltenes are shown in Table 1.

TABLE 1

Properties of Extracted Asphaltene

| | Normalized wt % | | |
|---|---|---|---|
| Elements | KEC-Asphaltene | LF-Asphaltene | KU[Asphaltene |
| N | 0.83 | 0.38 | 1.07 |
| C | 82.29 | 80.05 | 82.5 |
| H | 8.31 | 8.04 | 8.12 |
| S | 8.28 | 10.69 | 7.56 |
| Al | 0.01 | — | 0.01 |
| Mg | — | 0.02 | — |
| Si | 0.23 | 0.21 | 0.01 |
| Cl | 0.01 | 0.12 | 0.07 |
| K | 0.05 | 0.04 | 0.04 |
| Ca | — | 0.09 | 0.01 |
| V | — | 0.16 | 0.45 |
| Fe | — | 0.13 | 0.02 |
| Ni | — | 0.05 | 0.10 |
| Br | — | 0.01 | 0.01 |
| P | — | — | 0.01 |
| Total | 100 | 100 | 100 |

Example 2

Thermal Treatment

In this example, thermal treatment has been performed on LF asphaltene (LF-Asph) using both a stationary-tube furnace and a rotating quartz-tube furnace. The products obtained from the stationary furnace were inhomogeneous with ash content, while the ones from the rotating furnace were homogeneous without any traces of ash. Therefore, the rotating furnace was adopted for the thermal treatment of asphaltene. In each run, around 5-10 g of the parent asphaltene was placed in the quartz tube. Then, the carbonization process started by increasing the temperature at a rate of 3° C./min until reaching the set point temperature (i.e., 400 to 950° C.). The sample remained at the carbonization temperature for approximately 4 h. Throughout the whole carbonization process, a stream of nitrogen was introduced at a flow rate of 300 ml/min to maintain an inert medium and prevent oxidation reactions. To ensure uniform heat exposure on asphaltene particles, the furnace was continuously turning in a rotation angle of 3600 at an oscillation frequency of 3 rotations per minute in each direction. The losses due to thermal treatment fell in the range between 49-55%.

FIG. 1 illustrates the baseline corrected XRD patterns for the parent asphaltene and its graphene derivatives that were obtained at different carbonization temperatures (GD 400 to GD 950). The Figure illustrates the four characteristic bands (i.e., 7, graphene, 10, and 11) from which the structural parameters of crystalline carbon materials can be measured. The XRD results evidently designated that the layer distance between the aromatic sheets ($d_m$) and the distance between aliphatic chains and naphthenic sheets (dγ) have not been affected by the thermal treatment severity. The distance between the aromatic layers in LF-asphaltene was about 3.5 Å, and almost persisted constant at all carbonization temperatures. Likewise, the distance between aliphatic chains and naphthenic sheets did not significantly change and remained around 5.0 Å. Conversely, the average diameter of the aromatic sheet ($L_a$) significantly changed with thermal treatment. At relatively mild carbonization (i.e., 400° C.), $L_a$ slightly decreased from 11.7 Å to 9.5 Å; but then the size of the aromatic sheet started to gradually increase with carbonization severity, so that a significant increase in $L_a$ was observed beyond 600° C. The increase in $L_a$ clearly would suggest that the aromatic core has undergone secondary reactions, such as cyclization of alkyl side chains; combination of ring radicals by polymerization, dehydrogenation and aromatization of naphthenic rings; and condensation of aromatic rings.

The XRD result also revealed a reduction in the number of aromatic sheets (or layers) per stack (n) due to thermal exfoliation. The reduction in the number of aromatic sheets per stack, along with the loss of aliphatic carbon in the alkyl side chains, contributed to the observed reduction in the cluster diameter ($L_c$), which was approximately 23 Å (Angstroms) in the parent asphaltenes and decreased to around 17 Å after thermal treatment. Evidently, both the cluster height and the number of aromatic sheets per stack in the carbonized products would infer the formation of few layered graphene, as the thickness of a single layer graphene is roughly 3.4 Å. The removal of aliphatic carbon in the side chains, on the other hand, is reflected by the notable increase in aromaticity from 0.17 to nearly 0.80. The aromaticity here was measured from the area of resolved peaks for the 7- and graphene-bands. Thus, the calculated values were only based on the aromatic carbon that contributed to the graphene-band, instead of all aromatic carbon of asphaltene. Therefore, the proposed aromaticity from XRD could be indicative and could not have represented the true aromaticity.

Figure 2:
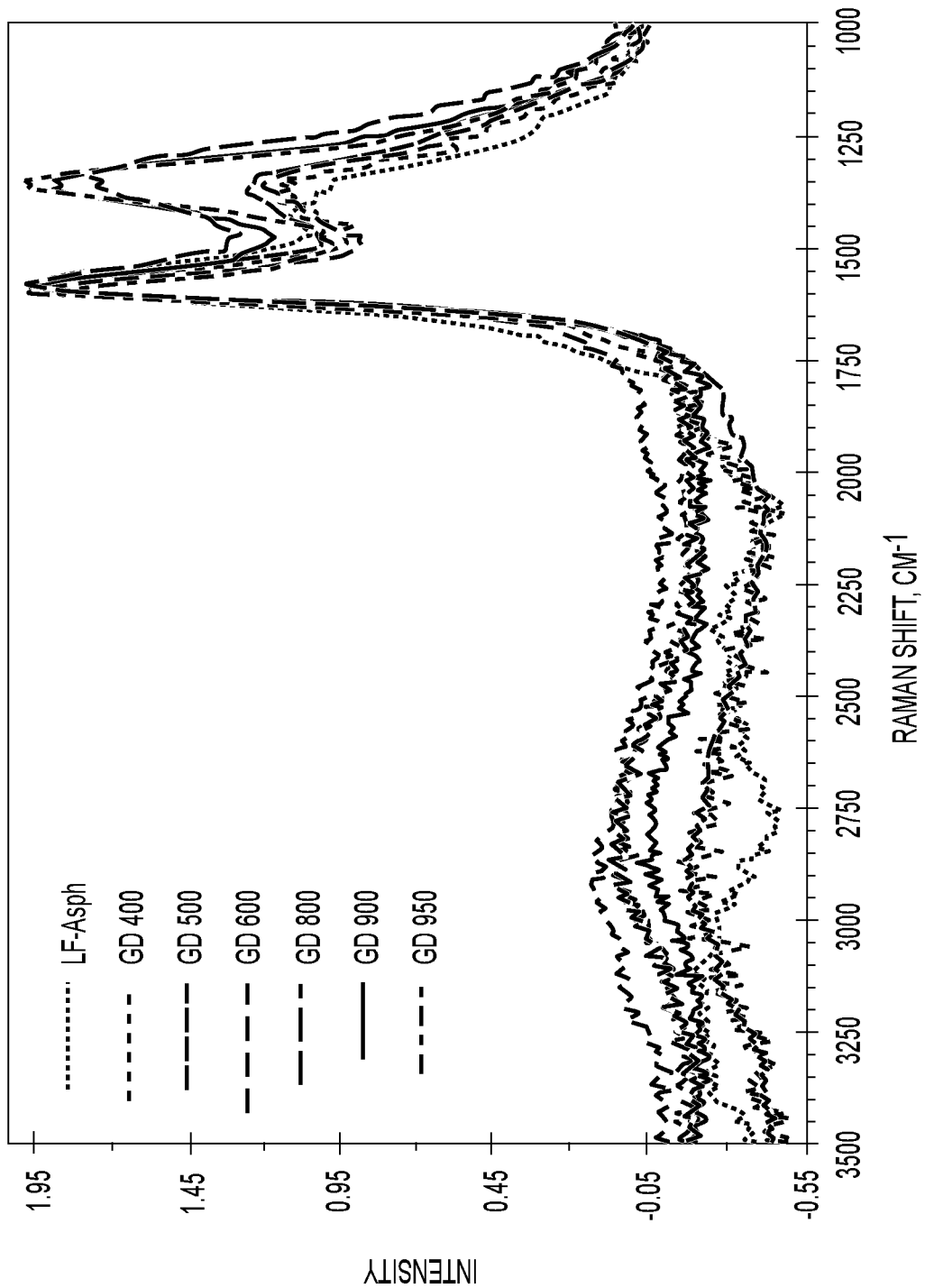
FIG. 2 is a composite of Raman spectra of LF asphaltene and corresponding graphitized products at different temperatures.

FIG. 2 shows the Raman spectra of LF-asphaltene and its graphene derivatives. All Raman spectra displayed the D- and G-bands; whereas the 2D-band was only clearly defined in the carbonized samples. The observed change in the G-band position and the 2D-band shape and width are strong indications of variations in the number of aromatic layers. According to the literature, the G-band position for graphite (n=∞) is at ~1581.6 cm$^{-1}$ while it is ~1587 cm$^{-1}$ for monolayer graphene (n=1). The Raman spectra in FIG. 2 also reveal that the D-band has become more protuberant as the carbonization severity increases. The intensity and the bandwidth of the D-band almost became comparable to that of the G-band for the samples treated at 800° C. and above, which could either suggest a high functionalization degree or significant structural disorders. Such an increase in the D-band was reported by one researcher for co-doped graphene, and was attributed to the presence of heteroatoms (S & N) and the increase in aromatic sheet detectable edges. Another researcher also reported similar behavior in the D-band while carbonizing anthracene-based carbon, and attributed this phenomenon to the secondary carbonization and to the release of hydrogen atoms that are fixed on the edges of the ploy-aromatic layers.

The Raman spectra in FIG. 2 have been used to measure the average diameter of the aromatic sheet ($L_a$) and the number of aromatic layers per stack (n). The $L_a$ measurement was performed based on the findings of a recent study by two of the inventors, while n was calculated by using empirical equations proposed by other researchers. The Raman results designate comparable $L_a$ measurements to the ones previously obtained by XRD, in terms of the overall trend, but the exact values of $L_a$ illustrated some variations, which are expected from different characterization techniques. The obvious increase in $L_a$ size with temperature, observed in both XRD and Raman, was previously credited to the secondary reactions in the aromatic core. The Raman results also revealed a reduction in the number of aromatic sheets per stack as the carbonization severity increases, which is consistent with the XRD findings, and thereby confirms the thermal exfoliation of aromatic sheets.

Figure 3:
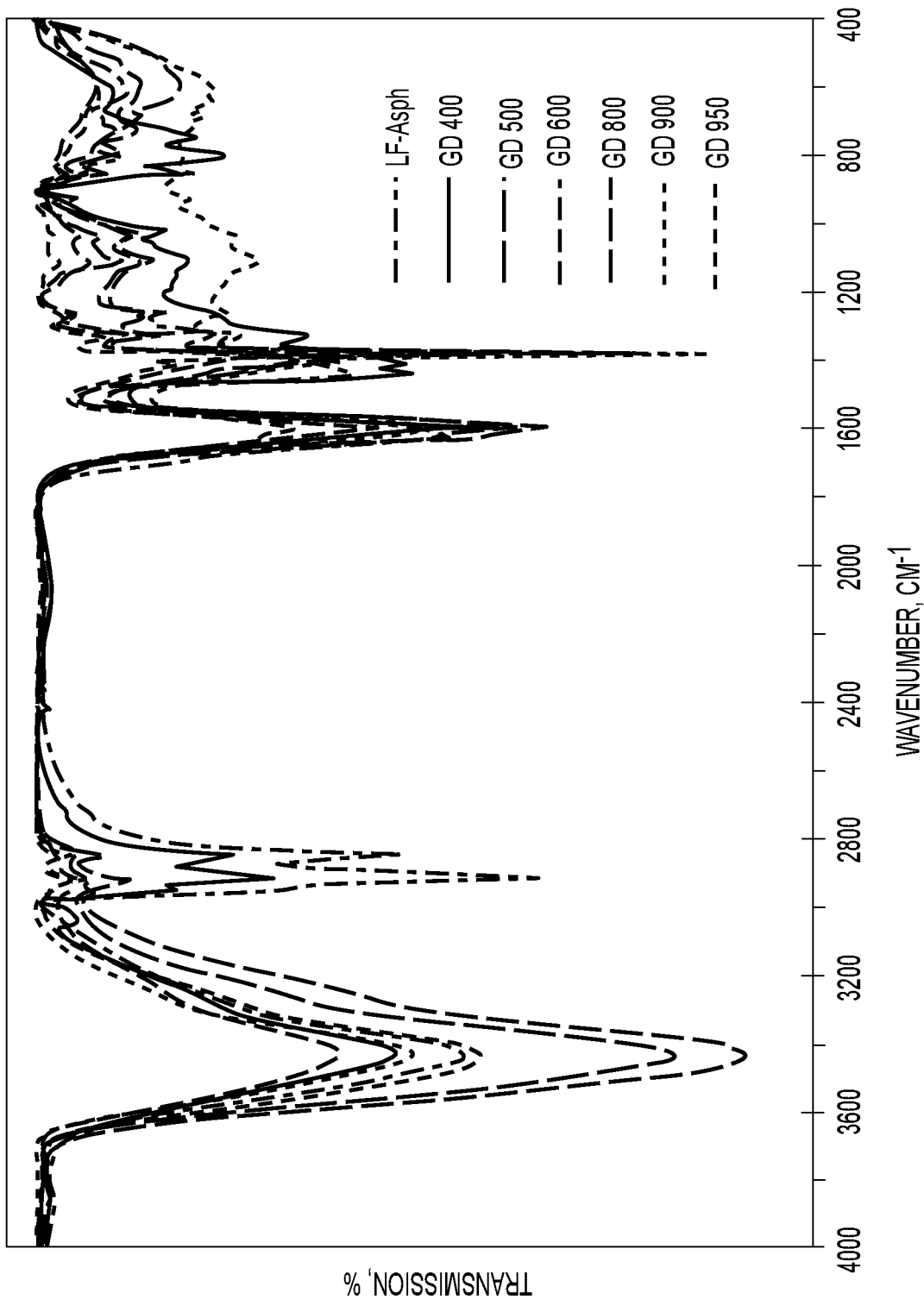
FIG. 3 is a composite of drift reflectance infrared transform (DRIFT) spectra of LF asphaltene and corresponding graphitized products at different temperatures.

FIG. 3 illustrates the DRIFT spectra of LF-asphaltene and its corresponding graphitized products at different temperatures. The diffused reflectance infrared transform (DRIFT) spectrum of the asphaltene indicates an abundance in saturated hydrocarbons, reflected in the absorptions at 2957, 2924, 2850, 1455, and 1376 cm$^{-1}$. The three peaks at 2957, 2924, and 2850 cm$^{-1}$ were due to the saturated CH stretching vibrations; while the other peaks at 1455 and 1376 cm$^{-1}$ featured the CH bending vibrations. The asphaltene spectrum also showed aromatic ring (aryl) hydrocarbons, illustrating specific frequencies at the regions as follows: 3150-3000, 1615-1580, 1250-950, and 900-700 cm$^{-1}$. The broad peak at 1030 cm$^{-1}$ was assigned to S=O stretching vibration of sulfoxide, which confirmed the presence of heteroatoms in the sample and would suggest the possible oxidation of thiophenic compounds. The absorption peaks at the range of 1360-1250 cm$^{-1}$ are assigned to the C—N stretching of aromatic amine, whereas the absorption peaks at the range of 600-715 cm$^{-1}$ are assigned to the C—S stretching of thioethers and disulfides. The FTIR spectrum of parent asphaltenes also indicated the existence of various oxygen functional groups at 3450-3350 cm$^{-1}$, 1730-1630 cm$^{-1}$, and 1050-1250 cm$^{-1}$. The broad band in the range of 3450-3350 cm$^{-1}$ is assigned to the OH group stretching vibrations, which could either be attributed to the OH from C—OH or the water adsorption. The absorption peaks at the range of 1730-1630 cm$^{-1}$, on the other hand, is normally assigned to C=O stretching vibration of carboxyl and carbonyl functional groups; whereas, the absorption peaks at the range of 1050-1250 cm$^{-1}$ might be attributed to the C—O stretching vibrations from the epoxy groups (C—O—C) and alcohol (C—OH).

The comparison between the FTIR spectra of LF-asphaltene and its graphene derivatives designated obvious changes, as shown in FIG. 3. For instance, the aromatic C—H stretching peak that appeared near 3050 cm$^{-1}$ in the LF-asphaltene could hardly be observed after thermal treatment. Likewise, the notable peaks of aliphatic chains stretching vibration in the range of 2850-2950 cm$^{-1}$ have gradually diminished as the temperature increased. Similarly, the peaks of aliphatic CH bending vibration at 1455 cm$^{-1}$ and 1376 cm$^{-1}$ could hardly be detected after severe thermal treatment. The changes in the aliphatic and aromatic nature in the carbonized products were investigated by monitoring the changes in aliphatic C—H stretching modes (3000-2750 cm$^{-1}$) with respect to aromatic C—H stretching mode (3150-3000 cm$^{-1}$). The results indicated an obvious decrease in aliphatic/aromatic ratio [n(CH$_{1-3}$)$_{al}$/m(CH)$_{ar}$], which confirm the removal of aliphatic side-chain from the large aromatic cluster. The increase in aromaticity with carbonization can be also exemplified through the intensity ratio between C=C aromatic stretch at 1600 cm$^{-1}$ and the CH aliphatic stretch at 2924 cm$^{-1}$. The change in aliphatic nature, on the other hand, can be elucidated by the changes in ratio between the methylene and methyl groups [CH$_2$/CH$_3$], which can be observed from the intensity ratios of $I_{2924}/I_{2957}$, $(I_{2924}+I_{2850})/I_{2957}$, and $I_{1455}/I_{1376}$. The results revealed significant reduction in the CH$_2$/CH$_3$ ratio, which suggests a substantial decrease in the average length of the alkyl side chains as the carbonization temperature increases.

Example 3

Heteroatoms and Defects

CHNS elemental analysis was conducted on LF-asphaltene and its graphene derivatives to determine their composition of their main elements. The results revealed an increase in the carbon content and a decrease in the hydrogen content as the thermal treating severity increased. The decrease in hydrogen content is mainly attributed to the removal of aliphatic substituents, as previously reported in the FTIR results. The elemental analysis also implied that the observed losses in hydrogen (wt %) were mainly compensated by increases in carbon contents, which confirms the previous conclusion about the secondary reactions in the aromatic core (e.g., cyclization of alkyl side chains; combination of ring radicals by polymerization, dehydrogenation and aromatization of naphthenic rings; and condensation of aromatic rings). The elemental analysis also indicated the presence of sulfur and nitrogen in the parent asphaltene and the graphene derivatives. The changes in sulfur and nitrogen contents with temperature happened to be insignificant, which apparently suggests the presence of these heteroatoms within the nearly intact aromatic sheet, instead of the eliminated aliphatic side chains. The complications associated with sulfur and nitrogen removals from asphaltene without catalysts are expected, considering that nitrogen exists in stable metal complexes within the molecules, while sulfur exists in refractory thiophenic compounds. The presence of these heteroatoms in such complex functional groups has been previously observed in the FTIR results.

The presence of sulfur and nitrogen was also confirmed by SEM-EDS analysis. Elemental analysis by SEM-EDS is very dependent on the examined site or the irradiated zone. Thus, the elemental results of this technique is not absolutely quantitative, but rather indicative. In agreement with the CHNS analysis, the EDS elemental results illustrated a slight increase in the carbon content as the carbonization temperature increases. The EDS analysis also confirms the insignificant change in sulfur level with carbonization severity. The nitrogen, conversely, was difficult to detect in the EDS analysis due to their position inside the sample.

Figure 4:
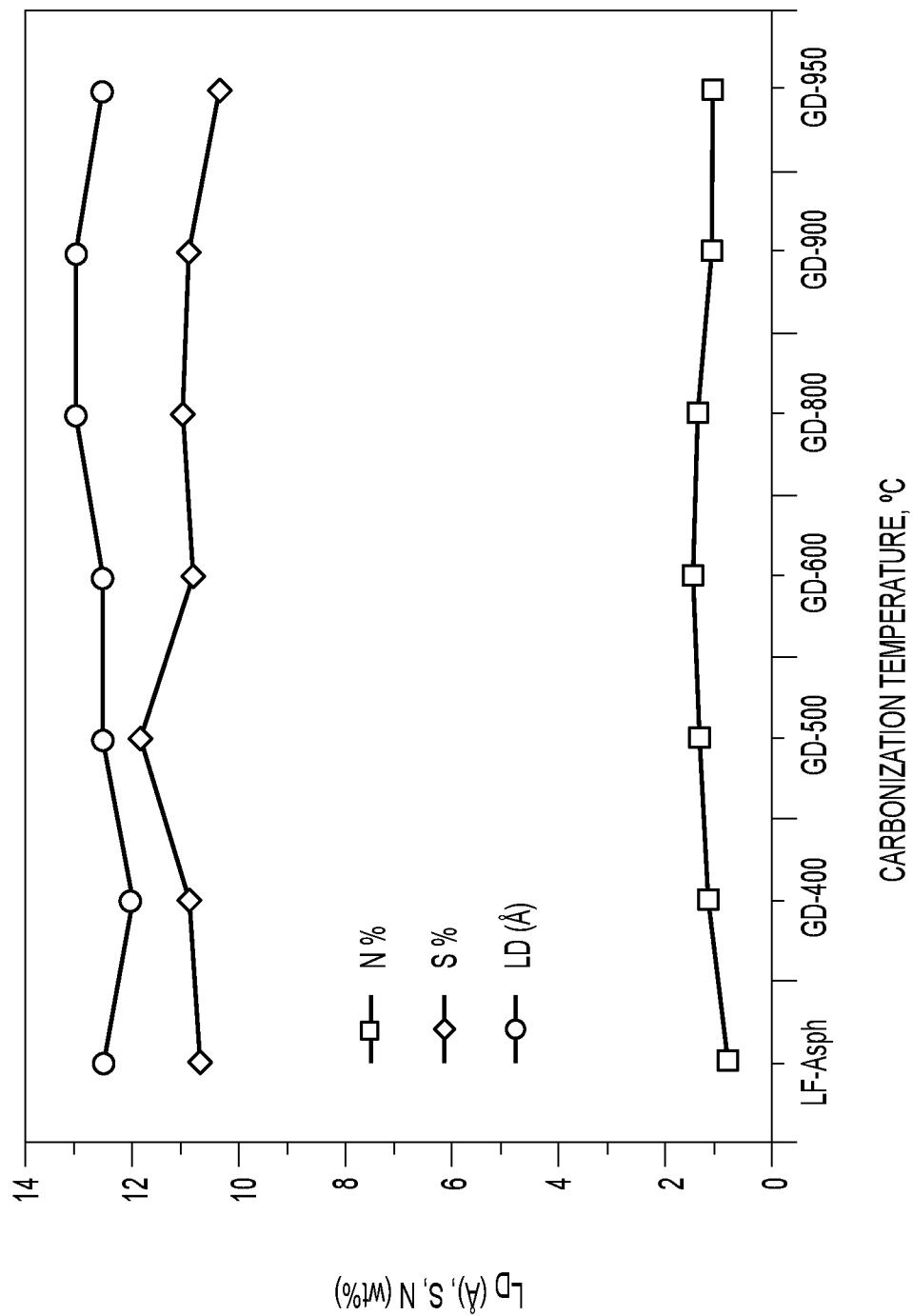
FIG. 4 is a composite graph of density of defects as a function of temperature for LF asphaltene and nitrogen and sulfur derivatives thereof.

FIG. 4 quantifies the density of defect in all graphene derivatives by measuring the average distance between two defects ($L_D$). The $L_D$ measurement showed an almost constant value (i.e., ~13 Å) for all samples. The constant trend in $L_D$ measurement was seen to be consistent with the trends observed in the sulfur and nitrogen measurements, which would indicate that the observed defects could mainly be related to the presence of these heteroatoms in the aromatic layers.

Example 4

Thermal Treatment and Asphaltene Impurities

Figure 5:
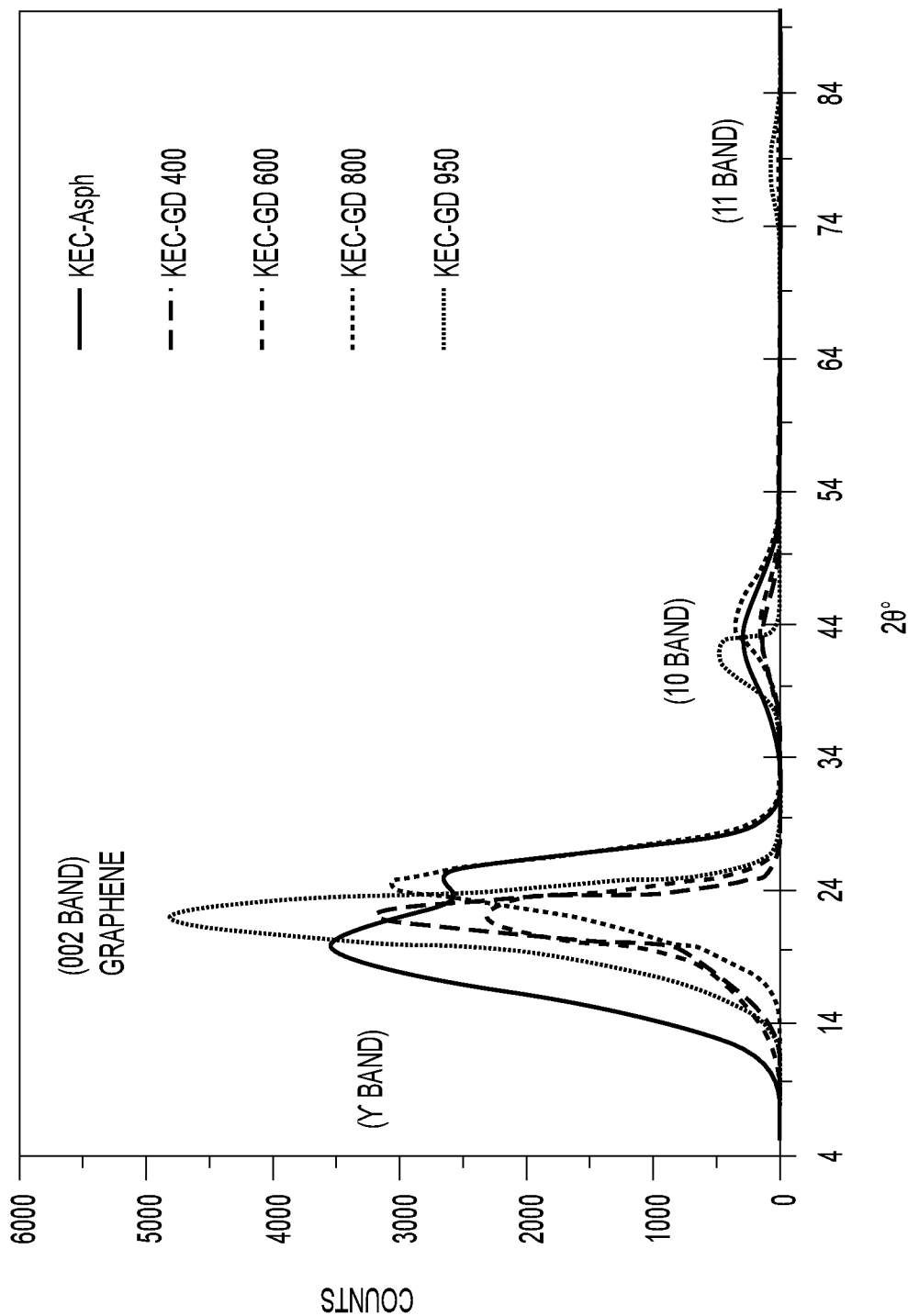
FIG. 5 is a composite diffractogram showing X-ray diffraction (XRD) patterns for KEC asphaltene at different temperatures.
Figure 6:
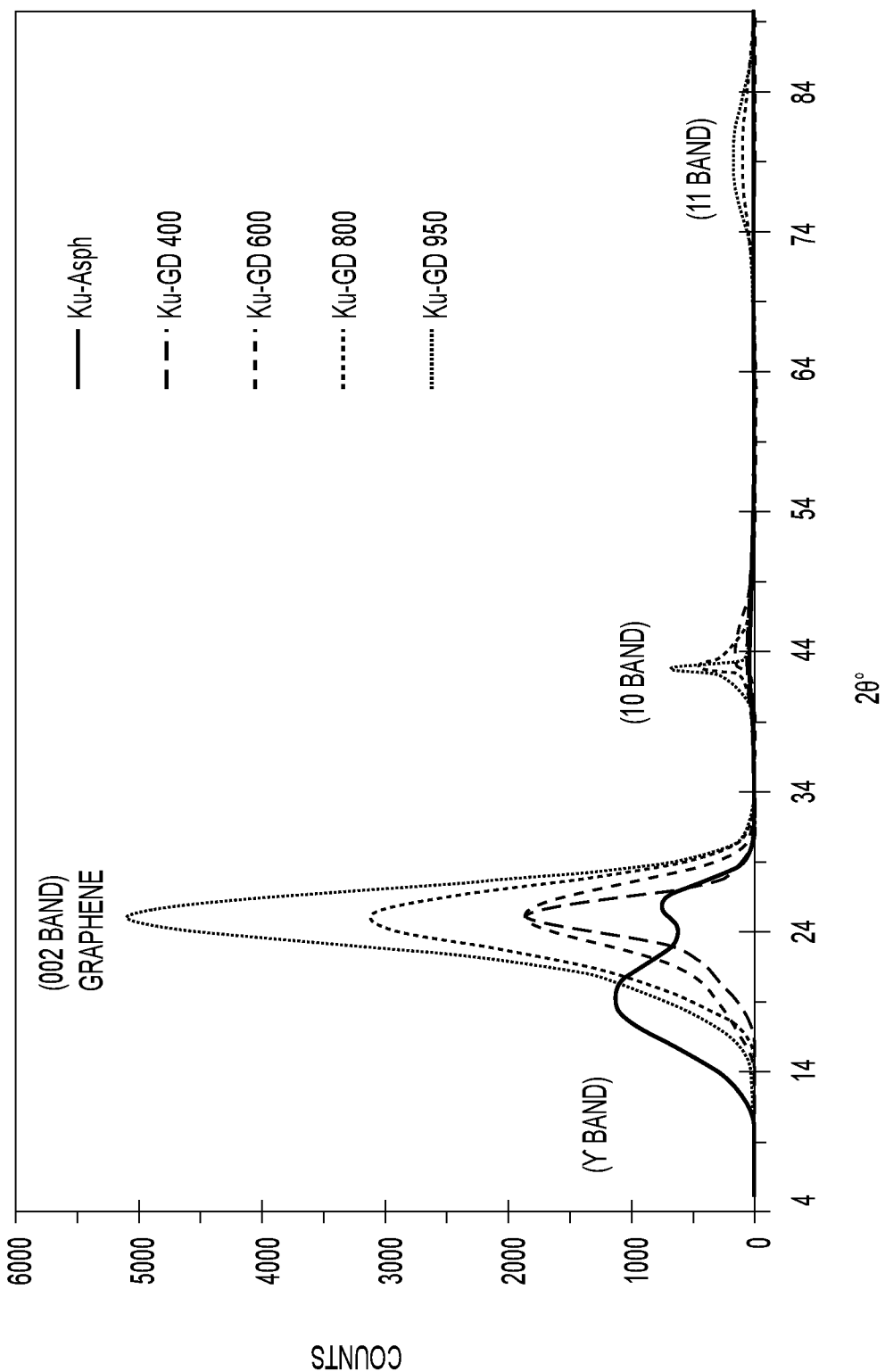
FIG. 6 is a composite diffractogram showing X-ray diffraction (XRD) patterns for Ku asphaltene at different temperatures.

In this example, the previously indicated thermal treatments of Example 2 have been intended on asphaltenes from different origins of different structures and compositions. The utilization of different asphaltenes provided valuable information about the impact of precursors' impurities (i.e., heteroatoms and metals) on the properties of the synthesized graphene derivatives. FIGS. 5 and 6, respectively, illustrate the baseline corrected XRD patterns for the asphaltene samples of KEC and Ku crudes along with their corresponding graphene derivatives (KEC-GD 400-950 and Ku-GD 400-950).

Example 5

Chemical Treatment with Acids

Figure 7:
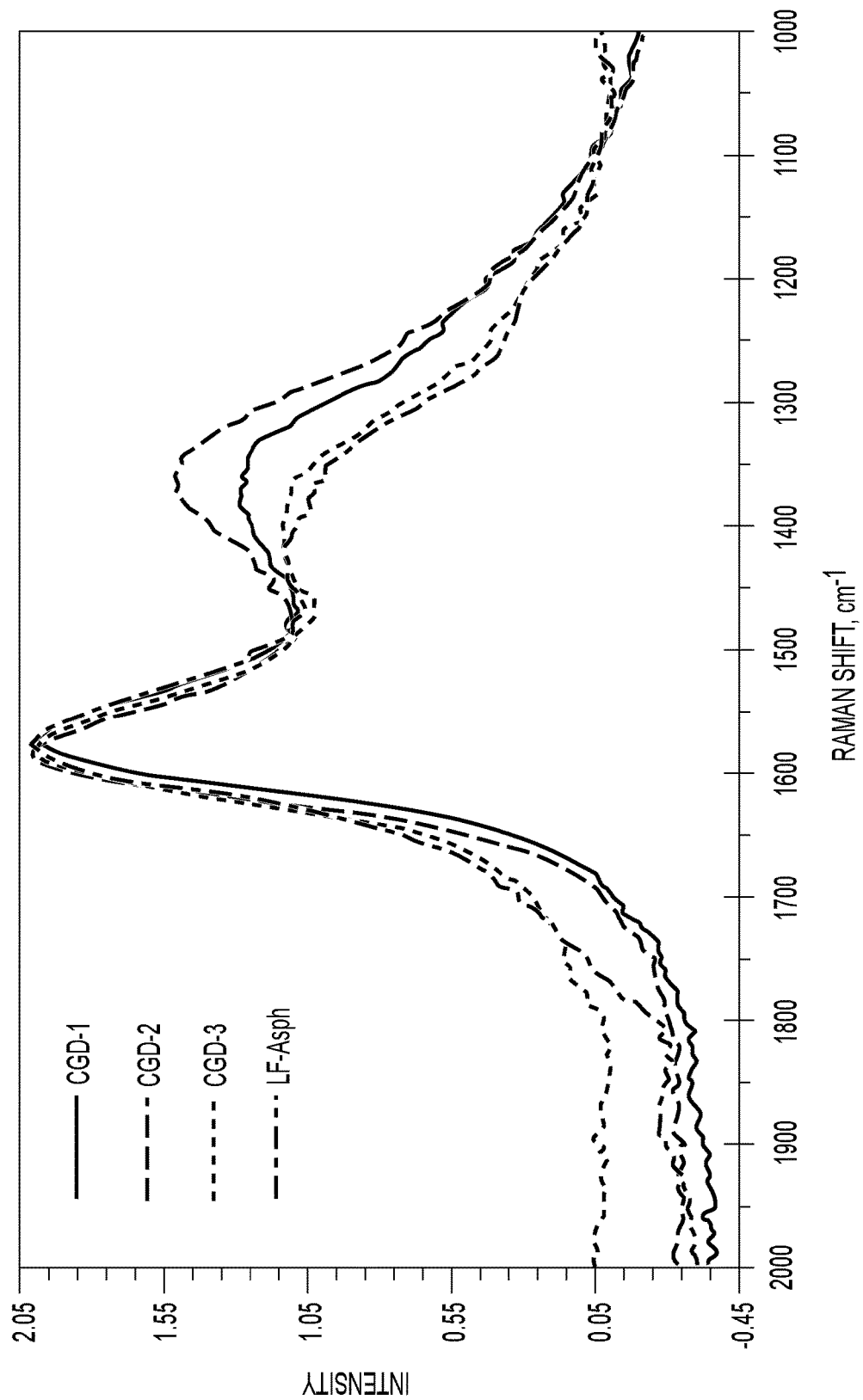
FIG. 7 is a composite of Raman spectra of LF asphaltene and corresponding derivatives produced by acid treatment
Figure 8:
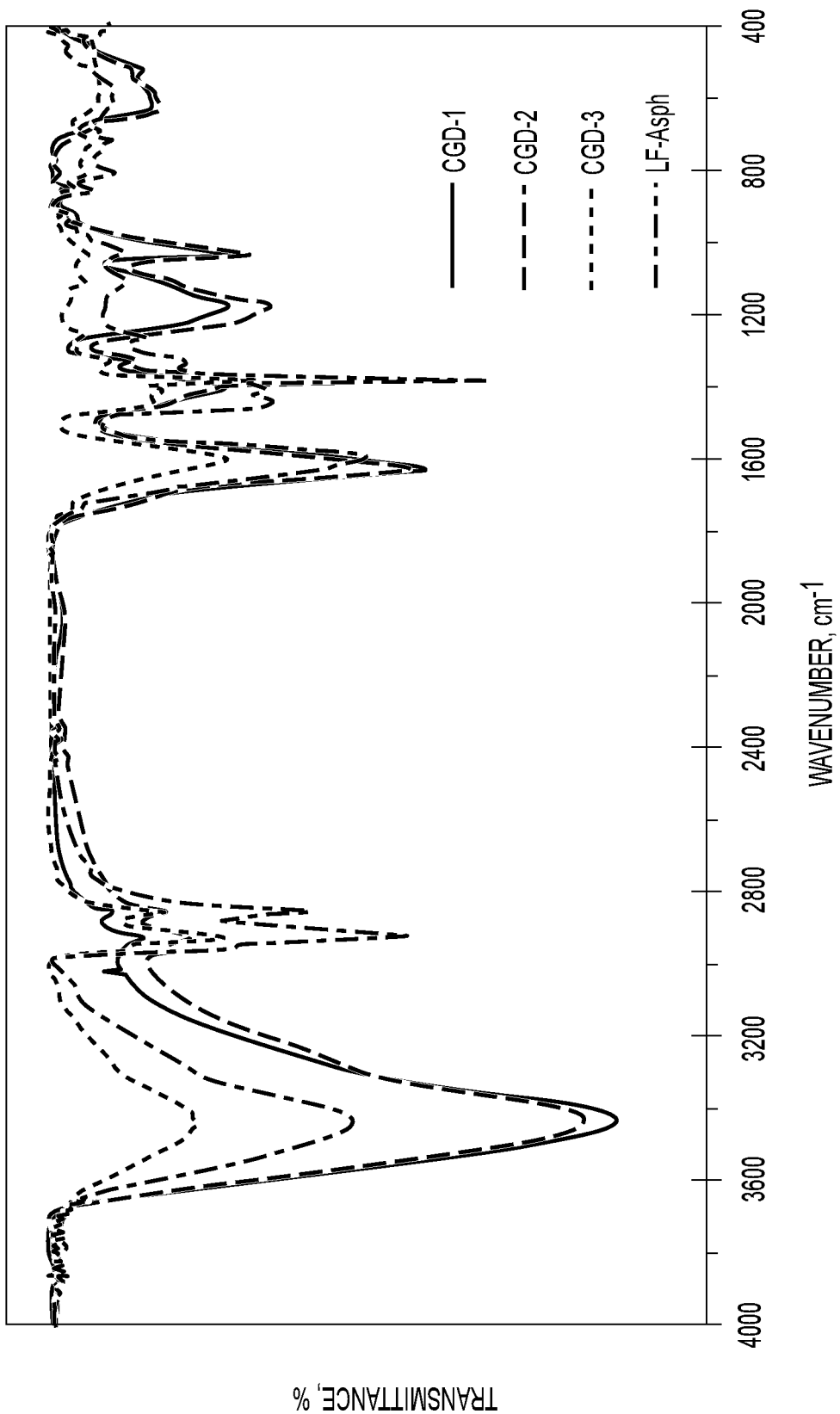
FIG. 8 is a composite of DRIFT spectra of LF asphaltene and corresponding graphene derivatives after acid treatments.

Approximately 0.40 g of LF-asphaltene was dispersed in a concentrated sulfuric acid (H$_2$SO$_4$, 98%), in a concentrated phosphoric acid ($H_3PO_4$, 88%), or in a binary acid mixture of sulfuric and phosphoric acids (9:1). The resulting suspension was stirred vigorously by a magnetic stirrer for 24 h at room temperature to functionalize the asphaltene and expand the interlayer distance between the aromatic sheets (intercalation). Then, 0.5 ml of hydrogen peroxide ($H_2O_2$) along with 50 g of ice was added into the solution, which was continuously stirred for another 2 h. The mixture was poured into 500 ml of deionized water and kept for 30 min under ultrasonic agitation (44 kHz±6%) to enhance the degree of exfoliation in the functionalized aromatic layers. The mixture was then allowed to settle for 12 h to physically separate the graphene derivatives (i.e., GO) from the aqueous solution. The purification of GO slurry started by dispersing the material into HCl (10%) solutions to remove sulfate ions and repeatedly centrifuged at 3500 rpm and 5° C. The purification continued by repeated cycles of dilution (or washing) with deionized water ($DI-H_2O$) until negative chloride, phosphate, and sulfate ions were achieved (i.e., neutral pH). The purification and centrifugation processes resulted in a gel-like substance that was initially dried at room temperature, and then at 60° C. for 6 h to form the GO powder. The different acid treatments in this example are summarized in Table 2, where samples are noted as chemical graphene derivatives (CGD-1 to CGD-3). This example mainly illustrates the effect of acids, as a liquid intercalating agent, on asphaltene intercalation and subsequently transformation to graphene derivatives (i.e., GO). FIGS. 7 and 8 respectively illustrate the Raman spectra and the DRIFT spectra of LF asphaltene before and after the acid treatments. The results indicate that the impact of $H_2SO_4$ on intercalating the aromatic layers of asphaltene is more profound than that of $H_3PO_4$. The employment of $H_3PO_4$ as a primary acid is not desirable, considering its cost, and is not justified, considering its limited impact on asphaltene intercalation. Nonetheless, the employment of $H_3PO_4$ as a secondary acid slightly contributed to asphaltene intercalation and exfoliation.

TABLE 2

Asphaltene treatment with acidic mixtures to form graphene derivatives

| Feed material | Amount (g) | $H_2SO_4$ (ml) | $H_3PO_4$ (ml) | $H_2O_2$ (ml) | DI-$H_2O$ (ml) | Sample code |
|---|---|---|---|---|---|---|
| LF-Asph | 0.40 | 50 | — | 0.5 | 50 | CGD-1 |
| LF-Asph | 0.40 | 45 | 5 | 0.5 | 50 | CGD-2 |
| LF-Asph | 0.40 | | 50 | 0.5 | 50 | CGD-3 |

Example 6

Chemical Treatment with Potassium Permanganate

Figure 9:
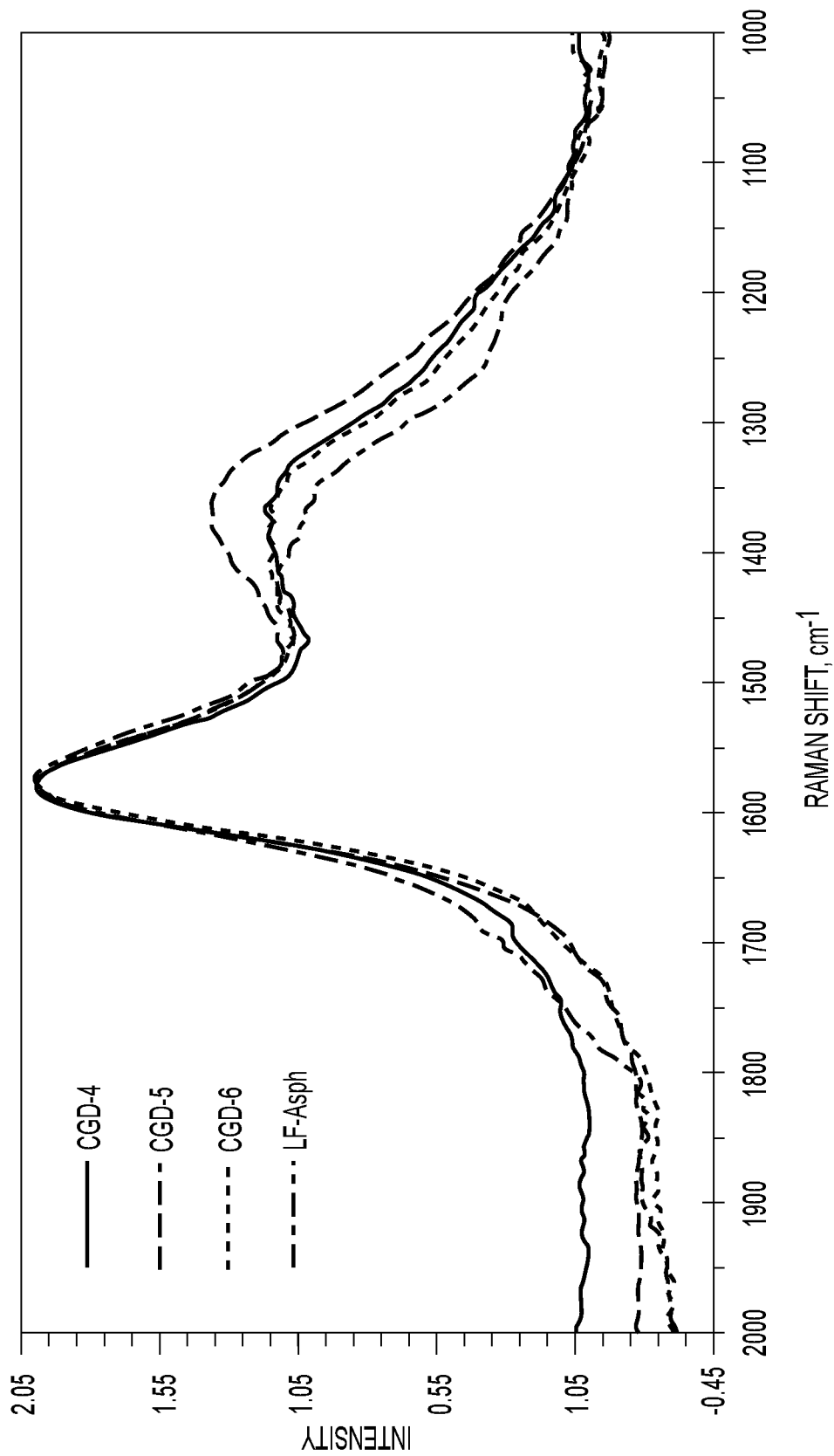
FIG. 9 is a composite of Raman spectra of LF asphaltene and corresponding derivatives produced by different concentrations of potassium permanganate.
Figure 10:
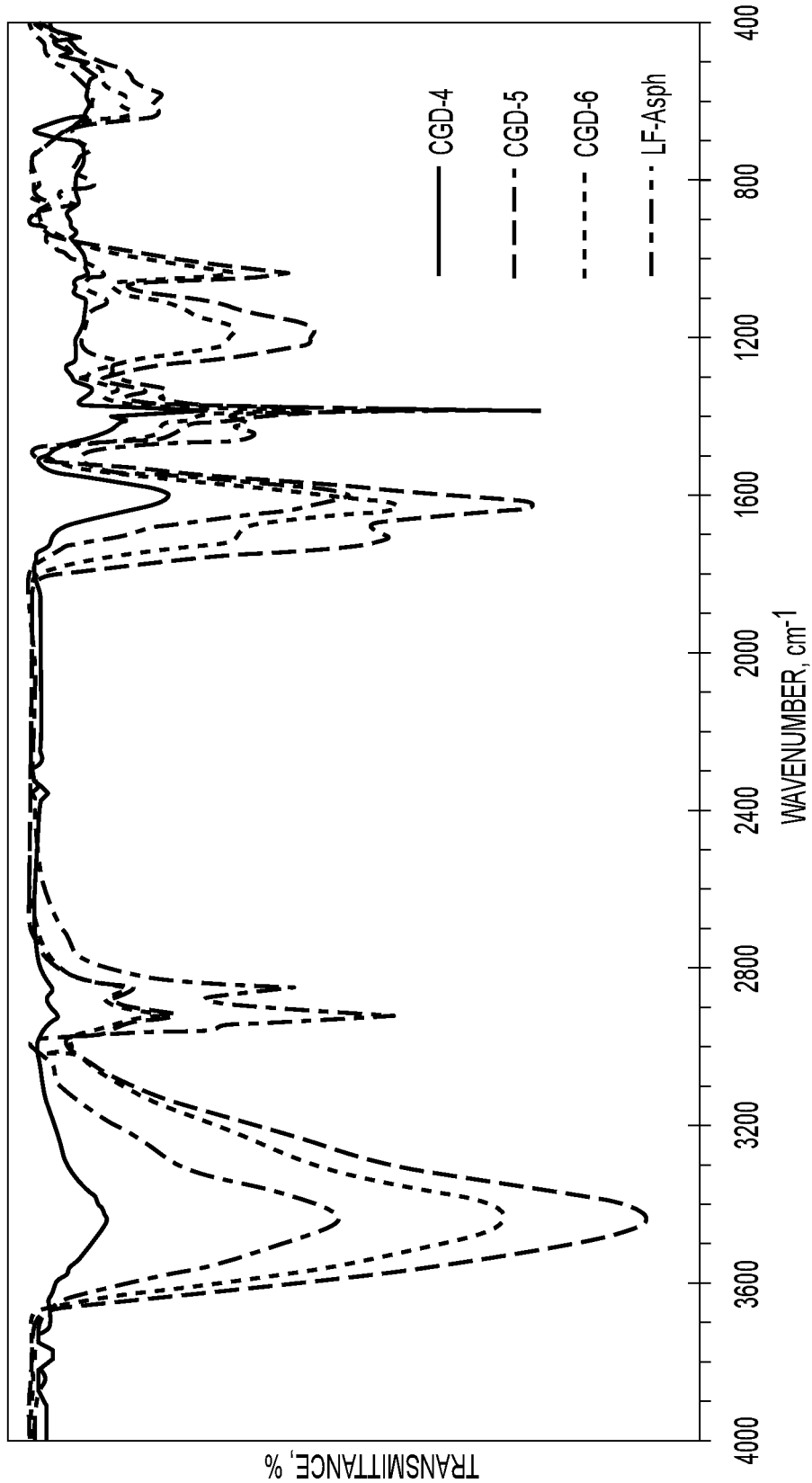
FIG. 10 is a composite of DRIFT spectra of LF asphaltene and corresponding derivatives produced by different concentrations of potassium permanganate.

Approximately 0.40 g of LF-asphaltene was dispersed in a binary acid mixture (9:1) of sulfuric ($H_2SO_4$) and phosphoric ($H_3PO_4$) acids. The asphaltene-acid mixture was stirred vigorously by a magnetic stirrer for 1 h at room temperature. The mixture of functionalized asphaltene was cooled in an ice bath (0° C.), then potassium permanganate ($KMnO_4$) was slowly added at a specific weight ratio (asphaltene:$KMnO_4$ is 1:6, 1:1, or 1:0.5). The gradual addition of $KMnO_4$ prevented any sudden increase in reaction temperature, which was maintained at around 15° C. The careful attention to temperature management at this stage should improve the yield and the quality of the process and should prevent potential hazardous situations. The resulting suspension was continuously stirred for 24 h at room temperature. The reaction was terminated by adding 0.5 ml of hydrogen peroxide ($H_2O_2$) along with 50 g of ice into the solution, which was continuously stirred for 2 h. Upon completion of the intercalation reaction, the mixture was gradually poured into 500 ml of deionized water ($DI-H_2O$) and kept for 30 min under ultrasonic agitation to enhance the degree of exfoliation in the functionalized aromatic layers. The mixture then was allowed to settle for 12 h to physically separate the graphene derivatives (i.e., GO) from the aqueous solution. The purification of GO started by dispersing the material into HCl (10%) solutions to remove sulfate ions and was repeatedly centrifuged at 3500 rpm and 5° C. The purification continued by repeated cycles of dilution (or washing) with deionized water until negative chloride, phosphate, and sulfate ions were achieved (i.e., neutral pH). The purification and centrifugation processes resulted in a gel-like substance that was initially dried at room temperature and then at 60° C. for 6 h to form the GO powder. The different chemical treatments of this example are summarized in Table 3, where samples are noted as CGD-4 to CGD-6. The example mainly illustrates the effect of strong oxidizing agent ($KMnO_4$) on asphaltene transformation to graphene derivatives (i.e., GO). The impact of strong oxidizing agent on asphaltene transformation to graphene derivative is illustrated in FIGS. 9 and 10. It is important to note here that the utilization of high $KMnO_4$ weight ratio (i.e., 1:6) has resulted in a substantial loss in mass, unreliable yield, poor repeatability, and insignificant production of GO due to excessive chemical reaction.

TABLE 3

Asphaltene treatment with potassium permanganate to form graphene derivative

| Feed material | Amount (g) | $H_2SO_4$ (ml) | $H_3PO_4$ (ml) | $KMnO_4$ wt ratio | $H_2O_2$ (ml) | DI-$H_2O$ (ml) | Sample code |
|---|---|---|---|---|---|---|---|
| LF-Asph | 0.40 | 45 | 5 | 1:6 | 0.5 | 50 | CGD-4 |
| LF-Asph | 0.40 | 45 | 5 | 1:1 | 0.5 | 50 | CGD-5 |
| LF-Asph | 0.40 | 45 | 5 | 1:0.5 | 0.5 | 50 | CGD-6 |

Example 7

Chemical Treatment with Ammonium Persulfate

Figure 11:
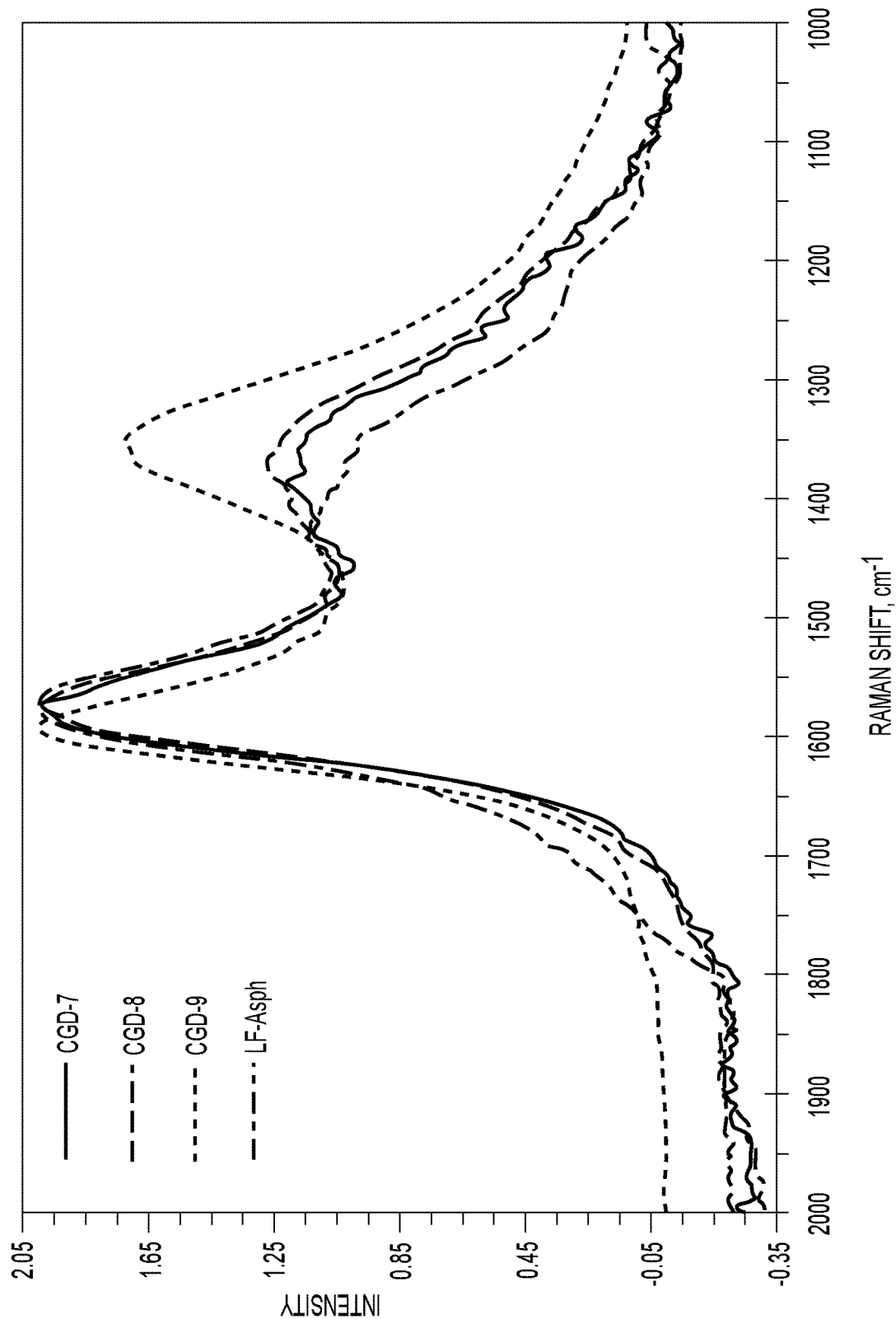
FIG. 11 is a composite of Raman spectra of LF asphaltene and corresponding derivatives produced by different concentrations of ammonium persulfate.
Figure 12:
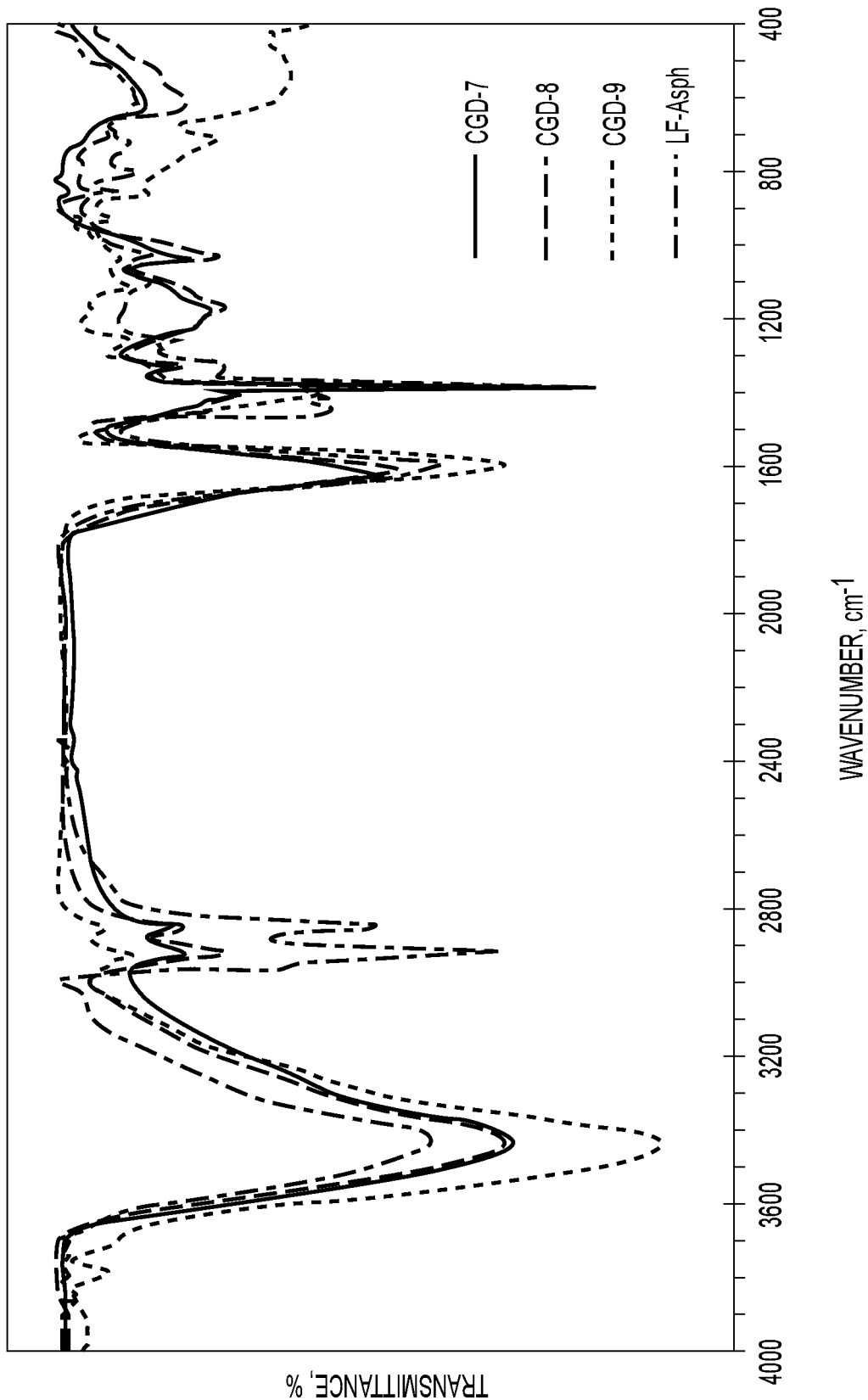
FIG. 12 is a composite of DRIFT spectra of LF asphaltene and corresponding derivatives produced by different concentrations of ammonium persulfate.

Approximately 0.40 g of LF-asphaltene was dispersed in a binary acid mixture (9:1) of sulfuric ($H_2SO_4$) and phosphoric ($H_3PO_4$) acids. The asphaltene-acid mixture was stirred for 1 h at room temperature. The mixture of functionalized asphaltene was cooled in an ice bath (0° C.), then a specific weight ratio of ammonium persulfate [$(NH_4)_2S_2O_8$] (i.e., 1:6, 1:1, or 1:0.5) was gradually added to the above suspension to avoid sudden increment in temperature. The mixture was kept under stirring condition for 24 h at room temperature. The reaction was quenched by adding 0.5 ml of hydrogen peroxide ($H_2O_2$) along with 50 g of ice into the solution, which was continuously stirred for 2 h. Then, the mixture was poured into 500 ml of deionized water and kept for 30 min under ultrasonic agitation to commence secondary exfoliation in the functionalized aromatic layers. The mixture then was allowed to settle for 12 h to physically separate the graphene derivatives (i.e., GO) from the aqueous solution. The purification of GO started by dispersing the material into HCl (10%) solutions to remove sulfate ions and was repeatedly centrifuged at 3500 rpm and 5° C. The purification continued by repeated cycles of dilution (or washing) with deionized water (DI-H$_2$O) until negative chloride, phosphate, and sulfate ions were achieved (i.e., neutral pH). The purification and centrifugation processes resulted in a gel-like substance that was initially dried at room temperature and then at 60° C. for 6 h to form the GO powder. The details of chemical treatments in this example are summarized in Table 4, where samples are noted as CGD-7 to CGD-9. The example mainly illustrates the effect of ammonium persulfate, as an oxidizing agent, on asphaltene transformation to graphene derivatives (i.e., GO). The impact of relatively weak oxidizing agent, (NH$_4$)$_2$S$_2$O$_8$, on asphaltene transformation to graphene derivative is illustrated in FIGS. 11 and 12.

TABLE 4

Asphaltene treatment with ammonium persulfate to form graphene derivative

| Feed material | Amount (g) | H$_2$SO$_4$ (ml) | H$_3$PO$_4$ (ml) | (NH$_4$)$_2$-S$_2$O$_8$ wt ratio | H$_2$O$_2$ (ml) | DI-H$_2$O (ml) | Sample code |
|---|---|---|---|---|---|---|---|
| LF-Asph | 0.40 | 45 | 5 | 1:6 | 0.5 | 50 | CGD-7 |
| LF-Asph | 0.40 | 45 | 5 | 1:1 | 0.5 | 50 | CGD-8 |
| LF-Asph | 0.40 | 45 | 5 | 1:0.5 | 0.5 | 50 | CGD-9 |

Example 8

Chemical Treatment of Graphite

Figure 13:
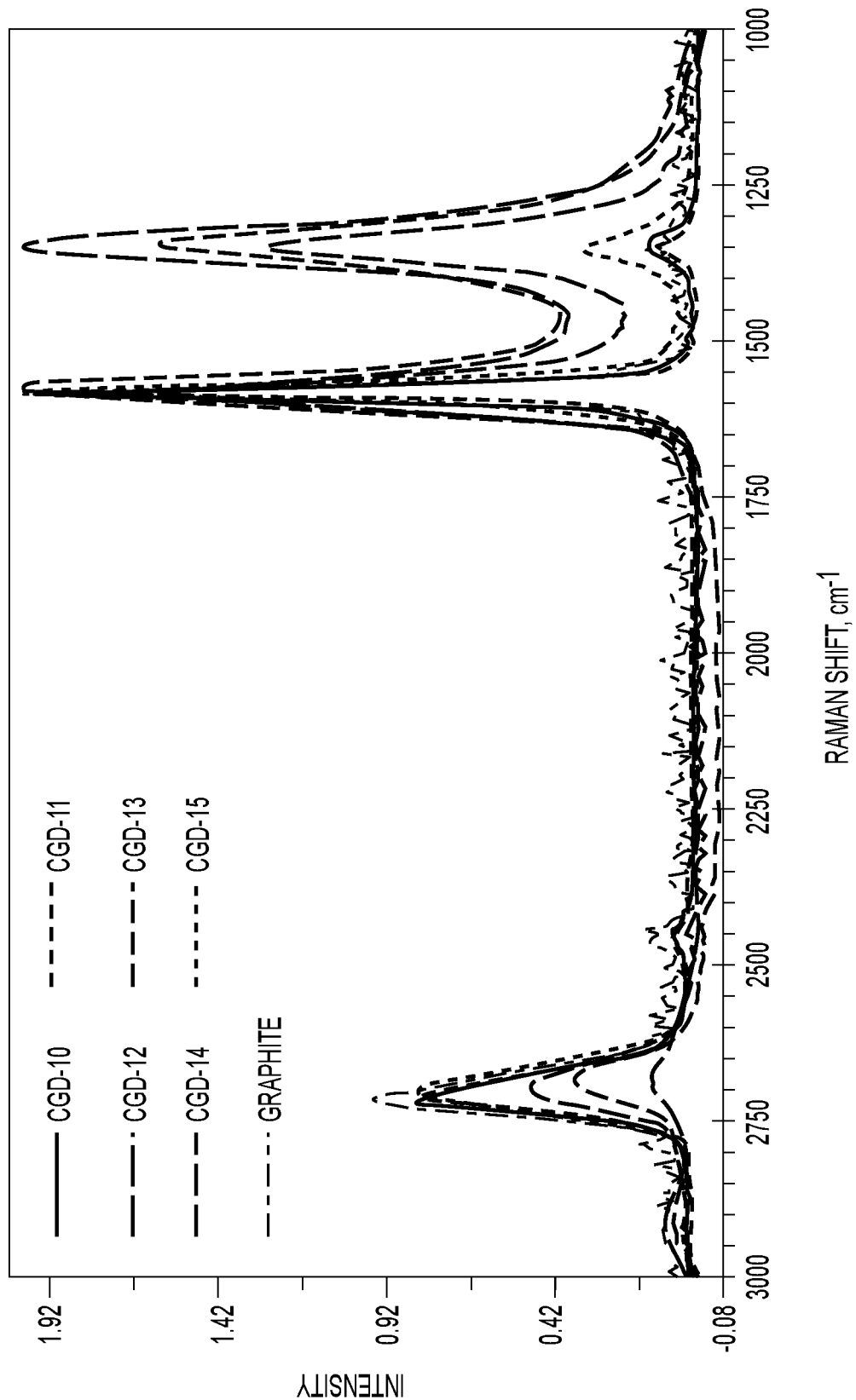
FIG. 13 is a composite of Raman spectra of graphite and corresponding derivatives after different chemical treatments.
Figure 14:
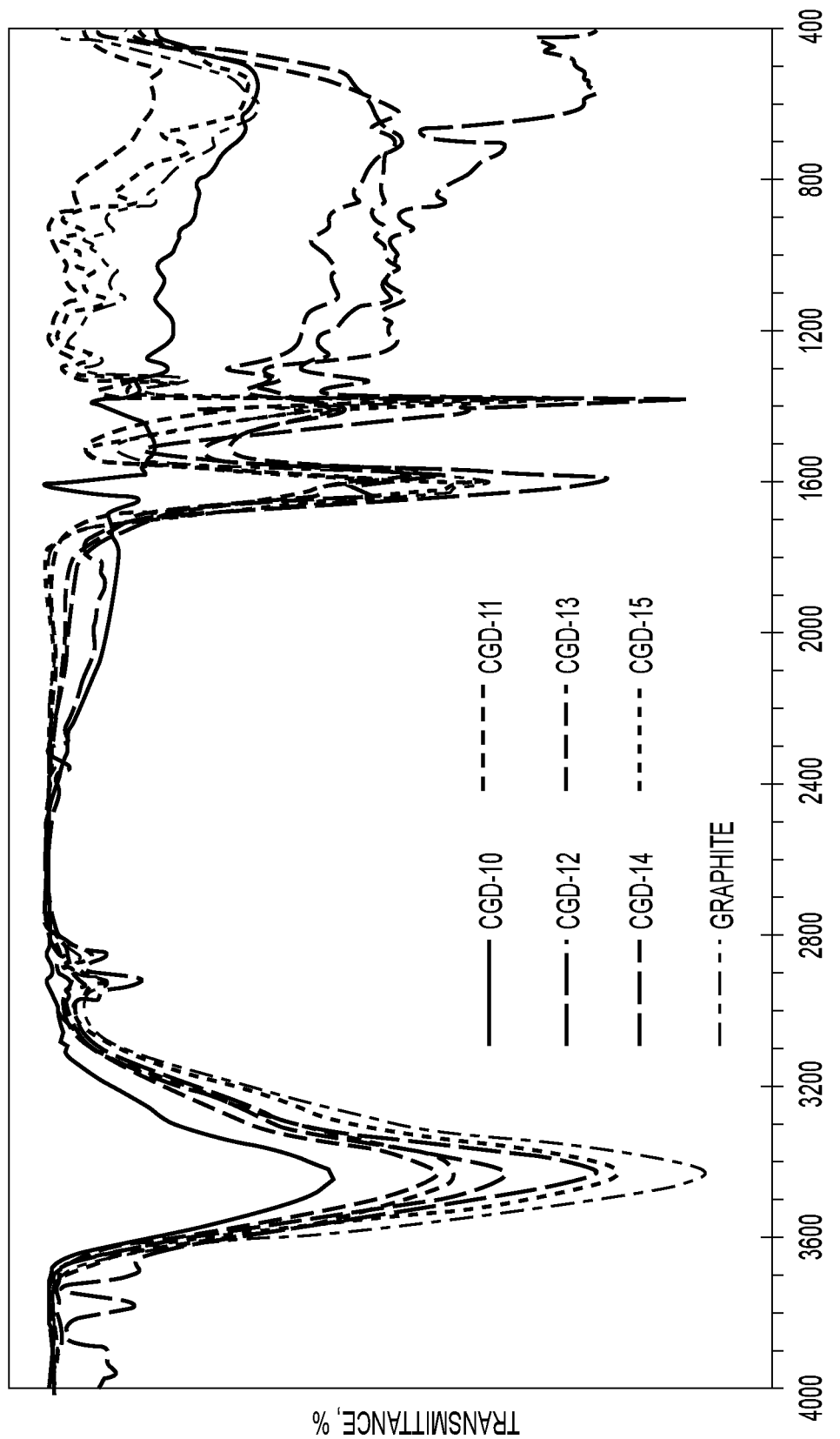
FIG. 14 is a composite of DRIFT spectra of graphite and corresponding derivatives after different chemical treatments.

The previous examples of chemical treatments were validated by using commercial graphite as a reference material. Approximately 0.40 g of commercial graphite was dispersed in the previously indicated acidic mixtures and continuously stirred for 1 h at room temperature. The mixture was cooled in an ice bath (0° C.), then a specific ratio of an oxidizing agent (i.e., KMnO$_4$ or (NH$_4$)$_2$S$_2$O$_8$) was carefully added to the suspension to keep the reaction temperature lower than 15° C. The mixture was stirred for 24 h, and then the reaction was terminated by adding 0.5 ml of H$_2$O$_2$ along with 50 g of ice into the solution and stirred for 2 h. Finally, the solution was poured into 500 ml of deionized water and kept for 30 min under ultrasonic agitation. The resulting mixture is washed repeatedly by centrifugation with 10% HCl and then with deionized water several times until it forms colloidal material at neutral pH. The colloidal substance was centrifuged at 3500 rpm and 5° C. Then, the solid was dried at room temperature to form the GO powder. The details of chemical treatments on the graphite sample are summarized in Table 5, where samples are noted as CGD-10 to CGD-15. The impacts of the different chemical treatments on graphite are shown in FIGS. 13 and 14, which respectively illustrate the Raman and the FTIR spectra. The comparison between graphite and asphaltene response to chemical treatments indicates that graphite is more refractory to acid treatments than asphaltene, as clearly reflected by the size of the D-band. Asphaltene, on the other hand, was more responsive to acid treatments due to its more vulnerable structure, as previously shown in FIG. 7. In contrast, the functionalization of graphite surface, which is normally reflected by the prominent D-band, requires a strong oxidizing agent, such as KMnO$_4$. The relatively weaker oxidizing agent, (NH$_4$)$_2$S$_2$O$_8$, has not effectively functionalized the graphite surface.

TABLE 5

Graphite chemical treatment to form graphene derivatives

| Feed material | Amount (g) | H$_2$SO$_4$ (ml) | H$_3$PO$_4$ (ml) | KMnO$_4$ wt ratio | (NH$_4$)$_2$S$_2$O$_8$ wt ratio | H$_2$O$_2$ (ml) | DI-H$_2$O (ml) | Sample code |
|---|---|---|---|---|---|---|---|---|
| Graphite | 0.40 | 50 | — | — | — | — | 50 | CGD-10 |
| Graphite | 0.40 | 45 | 5 | — | — | — | 50 | CGD-11 |
| Graphite | 0.40 | 45 | 5 | 1:6 | — | 0.5 | 50 | CGD-12 |
| Graphite | 0.40 | 45 | 5 | 1:1 | — | 0.5 | 50 | CGD-13 |
| Graphite | 0.40 | 45 | 5 | 1:0.5 | — | 0.5 | 50 | CGD-14 |
| Graphite | 0.40 | 45 | 5 | — | 1:0.5 | 0.5 | 50 | CGD-15 |

Example 9

Chemical Treatment in Solvents

Figure 15:
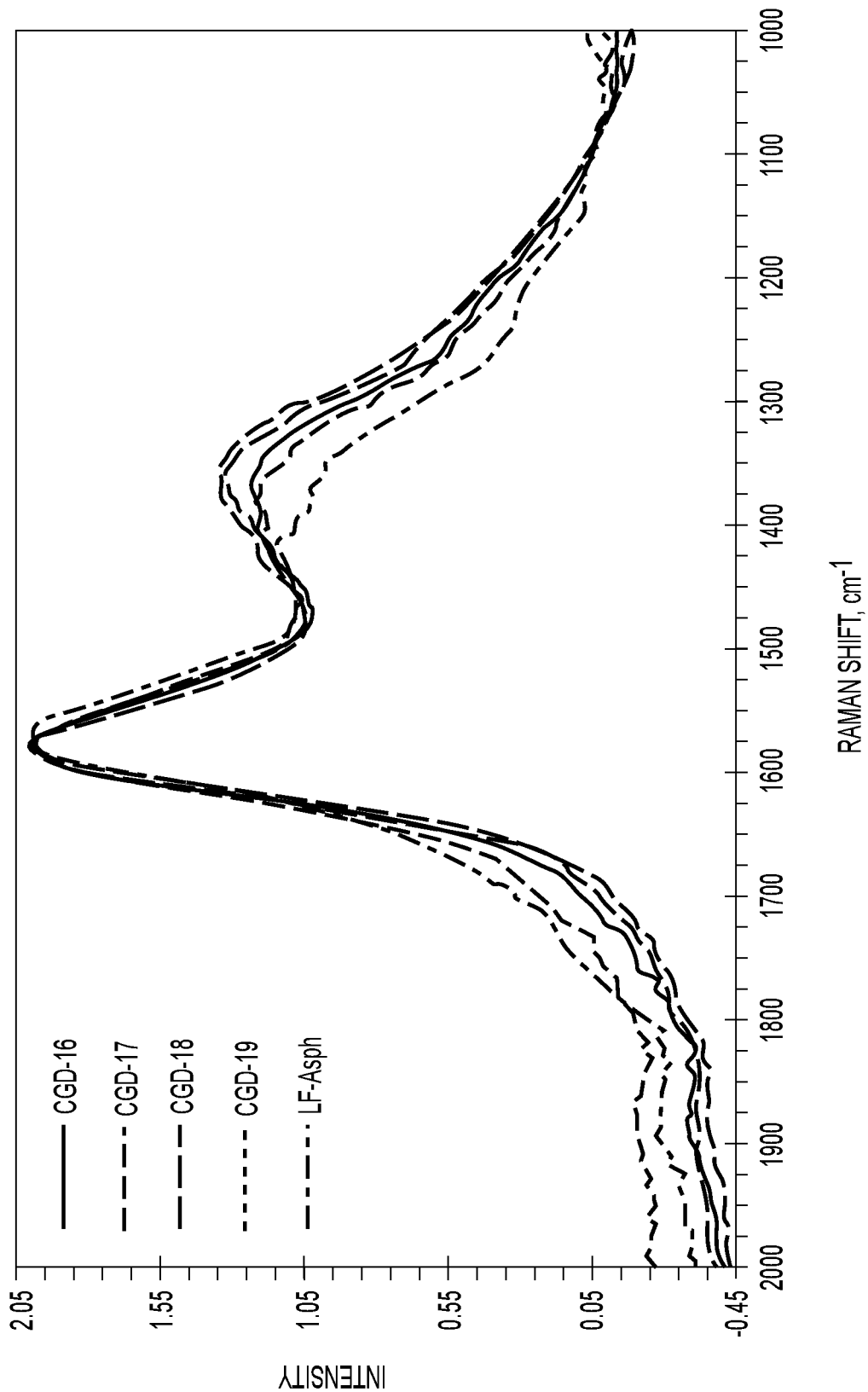
FIG. 15 is a composite of Raman spectra of LF asphaltene dissolved in various solvents and after different chemical treatment by oxidizing agents.
Figure 16:
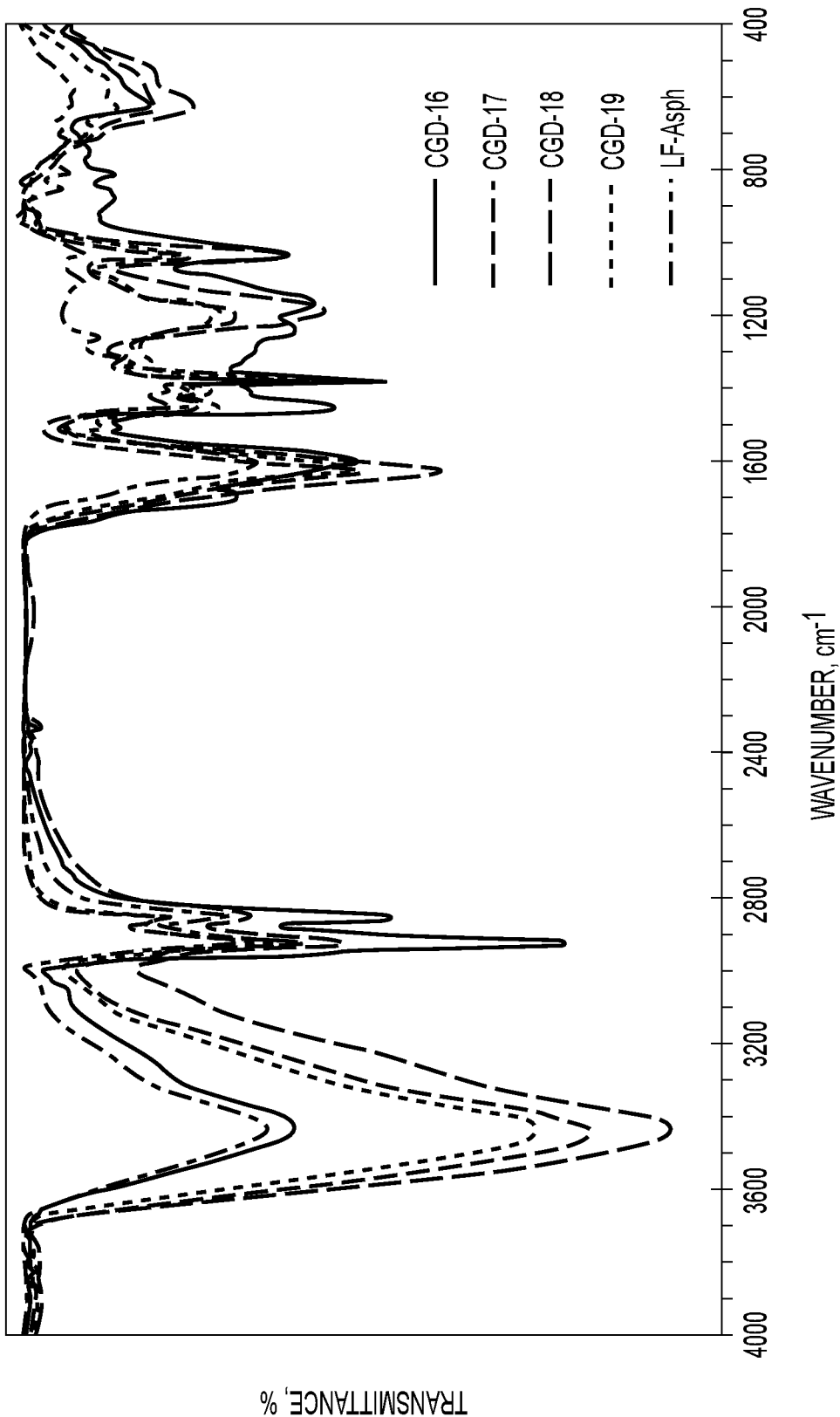
FIG. 16 is a composite of DRIFT spectra of LF asphaltene dissolved in various solvents and after different chemical treatment by oxidizing agents.

Approximately 0.4 g of asphaltene was dissolved in 250 ml of organic and inorganic solvents (i.e., toluene, benzene, carbon disulfide), and then the mixture was ultrasonicated for 2 h. The mixture was added to a binary acid solution (9:1) of sulfuric (H$_2$SO$_4$) and phosphoric (H$_3$PO$_4$) acids and stirred in a round bottom flask for 6 h. An oxidizing agent (i.e., KMnO$_4$ or (NH$_4$)$_2$S$_2$O$_8$) was added at 1:1 ratio to the mixture and then stirred for 12 h at room temperature. Finally, the resulting solution was filtered using vacuum filtration. The solid material was washed with de-ionized water till neutral pH is reached. The experimental details of this example is shown in Table 6, where samples are noted as CGD-16 to CGD-19. FIGS. 15 and 16, on the other hand, respectively illustrate the Raman and the DRIFT spectra for LF asphaltene after dissolving it in different solvents and exposing it to various chemical treatments.

TABLE 6

Asphaltene chemical treatment by organic and inorganic solvents

| Feed material | Amount (g) | Solvent | $H_2SO_4$ (ml) | $H_3PO_4$ (ml) | $KMnO_4$ wt ratio | $(NH_4)_2S_2O_8$ wt ratio | Sample code |
|---|---|---|---|---|---|---|---|
| LF-Asph | 0.40 | Toluene | 45 | 5 | 1:1 | — | CGD-16 |
| LF-Asph | 0.40 | Benzene | 45 | 5 | 1:1 | — | CGD-17 |
| LF-Asph | 0.40 | $CS_2$ | 45 | 5 | 1:1 | — | CGD-18 |
| LF-Asph | 0.40 | Toluene | 45 | 5 | — | 1:1 | CGD-19 |

Example 10

Thermal-Chemical Treatment of Asphaltenes

Figure 17:
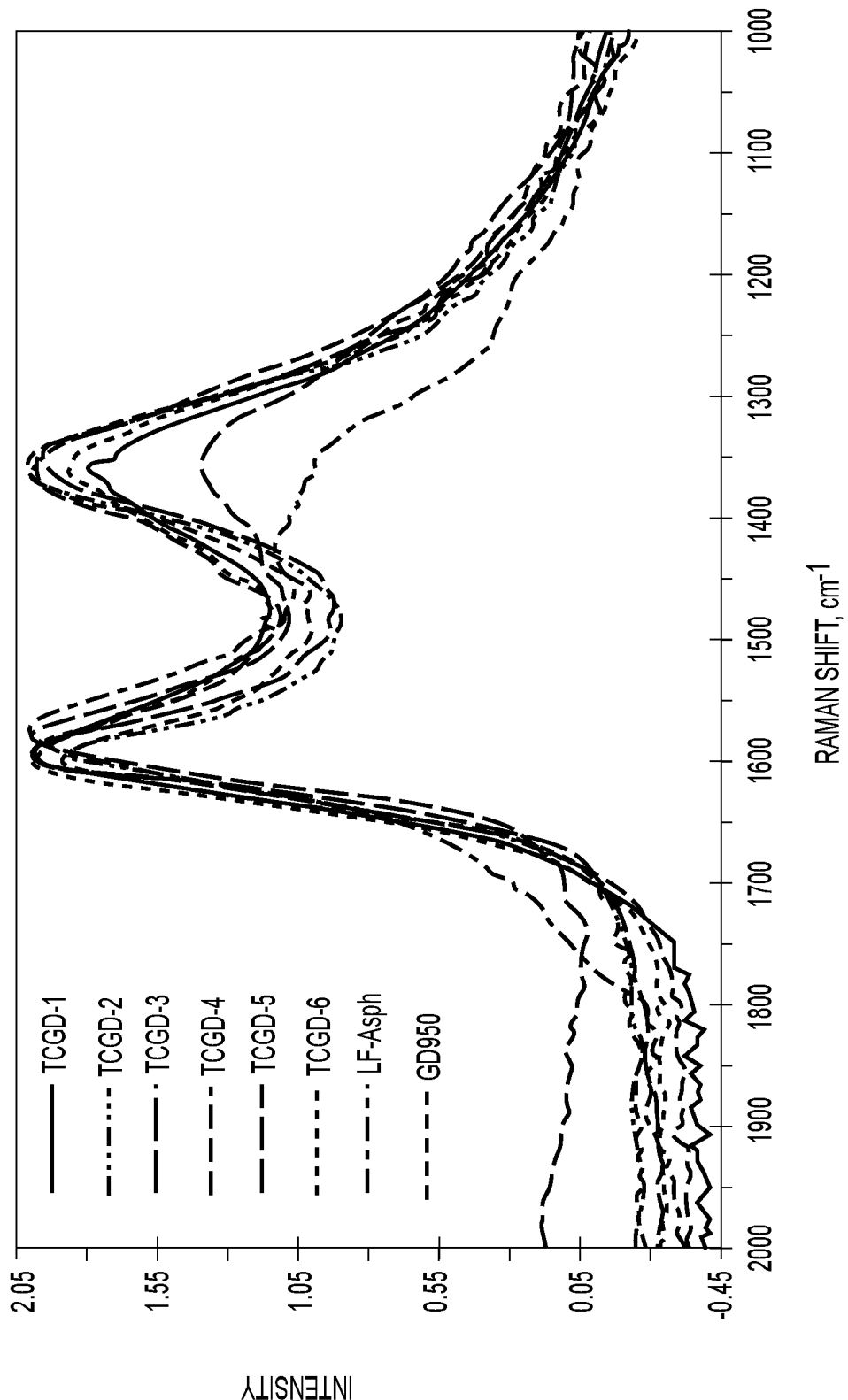
FIG. 17 is a composite of Raman spectra of thermally treated LF asphaltene after different chemical treatment.
Figure 18:
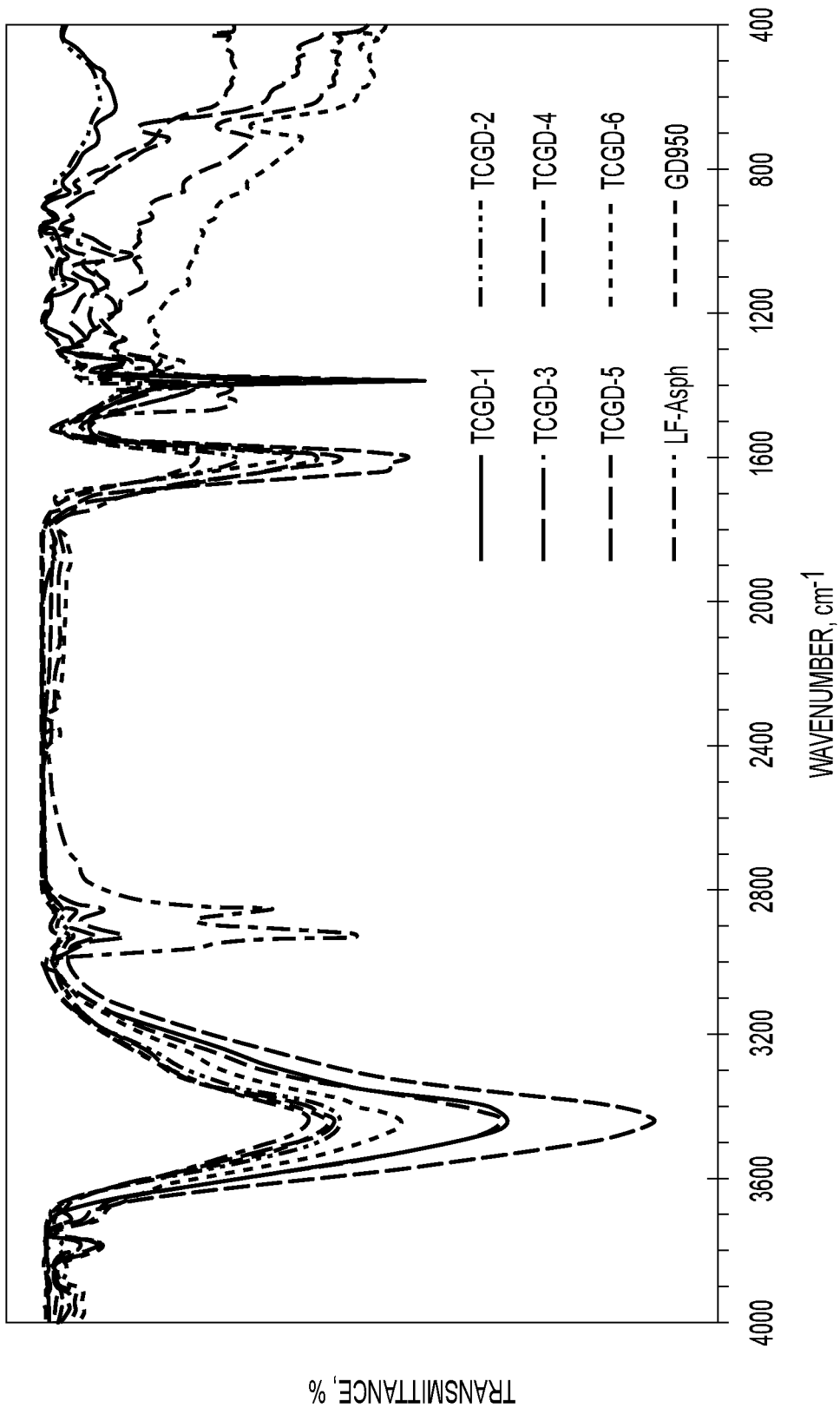
FIG. 18 is a composite of DRIFT spectra of thermally treated LF asphaltene after different chemical treatment.

A selected sample of thermally treated asphaltene (or graphene derivative) from Example 2 was exposed to different chemical treatments. The chosen sample was the one treated at 950° C. (i.e., GD-950). Approximately 0.37 g of that sample was dispersed in a concentrated sulfuric acid (98%) or a binary acid mixture of sulfuric and phosphoric acids (9:1). The mixture was stirred for 1 h at room temperature and then cooled in an ice bath (0° C.). A specific weight ratio of $KMnO_4$ or $(NH_4)_2S_2O_8$ was gradually added to the above suspension to avoid a sudden increment in temperature. The mixture was stirred for 24 h at room temperature. The reaction was terminated by adding 0.5 ml of hydrogen peroxide ($H_2O_2$) along with 50 g of ice into the solution, which was continuously stirred for 2 h. Next, the mixture was poured into 500 ml of deionized water and kept for 30 min under ultrasonic agitation to enhance the degree of exfoliation in the functionalized aromatic layers. The mixture then was allowed to settle for 12 h to physically separate the graphene derivatives (i.e., GO) from the aqueous solution. The purification of GO started by dispersing the material into HCl (10%) solutions to remove sulfate ions and was repeatedly centrifuged at 3500 rpm and 5° C. The purification continued by repeated cycles of dilution (or washing) with deionized water (DI-$H_2O$) until negative chloride, phosphate, and sulfate ions were achieved (i.e., neutral pH). The purification and centrifugation processes resulted in a gel-like substance that was initially dried at room temperature and then at 60° C. for 6 h to form the GO powder. The details of treatments in this example are summarized in Table 7, where samples are noted as TCGD-1 to TCGD-6. FIGS. 17 and 18 exemplify the impacts of the combined thermal and chemical treatments on the graphene derivatives.

It is to be understood that the method for synthesizing graphene derivatives from asphaltene is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:
1. A method for synthesizing graphene derivatives from asphaltene, comprising the steps of:
   grinding asphaltene to a powder;
   heating the powdered asphaltene in a heating chamber in a furnace while rotating the heating chamber and simultaneously maintaining a stream of inert gas through the heating chamber at a selected carbonization temperature for a carbonization period of time;
   dispersing the carbonized asphaltene in a liquid intercalating agent to form a suspension;
   subjecting the suspension of carbonized asphaltene to ultrasonic agitation to exfoliate the carbonized asphaltene; and
   purifying the suspension of exfoliated carbonized asphaltene by gradient differential centrifugation to obtain graphene derivatives from the asphaltene.
2. The method for synthesizing graphene derivatives according to claim 1, wherein said step of heating the powdered asphaltene in a heating chamber comprises heating the powdered asphaltene in a quartz tube.
3. The method for synthesizing graphene derivatives according to claim 1, wherein said inert gas comprises nitrogen.
4. The method for synthesizing graphene derivatives according to claim 1, wherein said selected carbonization temperature is between 400° C. and 950° C.
5. The method for synthesizing graphene derivatives according to claim 1, wherein said carbonization period of time comprises four hours.

TABLE 7

Thermal-chemical treatment of asphaltene to form graphene derivatives

| Feed material | Amount (g) | $H_2SO_4$ (ml) | $H_3PO_4$ (ml) | $KMnO_4$ wt ratio | $(NH_4)_2S_2O_8$ wt ratio | $H_2O_2$ (ml) | DI-$H_2O$ (ml) | Sample code |
|---|---|---|---|---|---|---|---|---|
| GD-950° C. | 0.40 | 50 | — | — | — | 0.5 | 50 | TCGD-1 |
| GD-950° C. | 0.40 | 45 | 5 | — | — | 0.5 | 50 | TCGD-2 |
| GD-950° C. | 0.40 | 50 | — | 1:6 | — | 0.5 | 50 | TCGD-3 |
| GD-950° C. | 0.40 | 45 | 5 | 1:6 | — | 0.5 | 50 | TCGD-4 |
| GD-950° C. | 0.40 | 45 | 5 | 1:1 | — | 0.5 | 50 | TCGD-5 |
| GD-950° C. | 0.40 | 45 | 5 | — | 1:6 | 0.5 | 50 | TCGD-6 |

6. The method for synthesizing graphene derivatives according to claim 1, wherein said liquid intercalating agent comprises at least one mineral acid.

7. The method for synthesizing graphene derivatives according to claim 1, wherein said liquid intercalating agent is selected from the group consisting of sulfuric acid, phosphoric acid, and a 9:1 mixture of sulfuric acid:phosphoric acid.

8. The method for synthesizing graphene derivatives according to claim 1, wherein said liquid intercalating agent comprises a mixture of acids and an oxidizing agent.

9. The method for synthesizing graphene derivatives according to claim 1, wherein said liquid intercalating agent comprises a mixture of acids and an oxidizing agent, the oxidizing agent being selected from the group consisting of potassium permanganate and ammonium persulfate.

10. The method for synthesizing graphene derivatives according to claim 1, wherein said step of subjecting the suspension of carbonized asphaltene to ultrasonic agitation comprises subjecting the suspension of carbonized asphaltene to ultrasonic agitation at a frequency of 44 kHz±6%.

11. The method for synthesizing graphene derivatives according to claim 1, wherein said step of purifying the suspension of exfoliated carbonized asphaltene by gradient differential centrifugation comprises repeatedly washing and centrifuging the suspension of exfoliated carbonized asphaltene with 10% HCl followed by washing and centrifuging the suspension of exfoliated carbonized asphaltene with deionized water until a neutral pH is obtained.

12. A method for synthesizing graphene derivatives, comprising the steps of:
grinding asphaltene to a powder;
heating the powdered asphaltene in a heating chamber in a furnace while rotating the heating chamber and simultaneously maintaining a stream of inert gas through the heating chamber at a selected carbonization temperature for a carbonization period of time;
dispersing the carbonized asphaltene in a solution of at least one mineral acid with stirring for one hour at room temperature, followed by cooling the dispersed asphaltene in an ice bath at 0° C.;
adding at least one oxidizing agent to the cooled acid solution of dispersed asphaltene to form a mixture and allowing the mixture to stand for twenty-four hours at room temperature;
adding hydrogen peroxide to the mixture to stop reaction between the at least one oxidizing agent and the dispersed asphaltene;
thereafter, pouring the mixture into deionized water and subjecting the mixture to ultrasonic agitation for thirty minutes to enhance exfoliation;
allowing the mixture to settle for twelve hours at room temperature to obtain a powder of graphene derivatives.

13. The method for synthesizing graphene derivatives according to claim 12, further comprising the step of purifying the powder of graphene derivatives by gradient differential centrifugation.

14. The method for synthesizing graphene derivatives according to claim 13, wherein said step of purifying the powder of graphene derivatives comprises repeatedly washing and centrifuging the powder of graphene derivatives with 10% HCl followed by washing and centrifuging the powder of graphene derivatives with deionized water until a neutral pH is obtained.

15. The method for synthesizing graphene derivatives according to claim 12, wherein said at least one mineral acid is selected from the group consisting of sulfuric acid, phosphoric acid, and a 9:1 mixture of sulfuric acid:phosphoric acid and said at least one oxidizing agent is selected from the group consisting of potassium permanganate and ammonium persulfate.

16. A method for synthesizing graphene derivatives from asphaltene, comprising the steps of:
dispersing asphaltene in a solution of at least one mineral acid with stirring by a magnetic stirrer for twenty-four hours at room temperature to form a mixture and to functionalize the asphaltene and expand the interlayer distance between aromatic sheets of the asphaltene;
adding hydrogen peroxide and 50 g of ice to the mixture, stirring continuously for another two hours;
thereafter, pouring the mixture into deionized water and subjecting the mixture to ultrasonic agitation at 44 kHz±6% for thirty minutes to enhance exfoliation;
allowing the mixture to settle for twelve hours at room temperature to obtain a slurry of graphene derivatives.

17. The method for synthesizing graphene derivatives according to claim 16, further comprising the steps of:
purifying the graphene derivatives by repeatedly washing and centrifuging the slurry of graphene derivatives with 10% HCl and centrifuging at 3500 rpm and 5° C., followed by washing and centrifuging the slurry of graphene derivatives with deionized water until a neutral pH is obtained, thereby obtaining a gel; and
then drying the gel at room temperature, followed by drying at 60° C. for 6 hours to obtain the graphene derivatives as a powder.

18. The method for synthesizing graphene derivatives according to claim 16, wherein said at least one mineral acid at least one mineral acid is selected from the group consisting of sulfuric acid, phosphoric acid, and a 9:1 mixture of sulfuric acid:phosphoric acid.

* * * * *